J. N. WINGETT.
ORE CLASSIFIER OR SEPARATOR.
APPLICATION FILED JUNE 16, 1913.
1,215,230.
Patented Feb. 6, 1917.
20 SHEETS—SHEET 19.
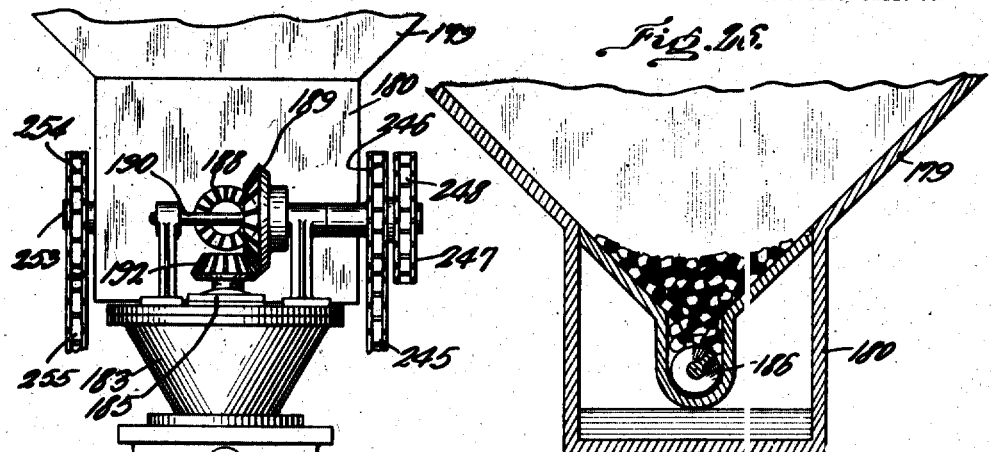
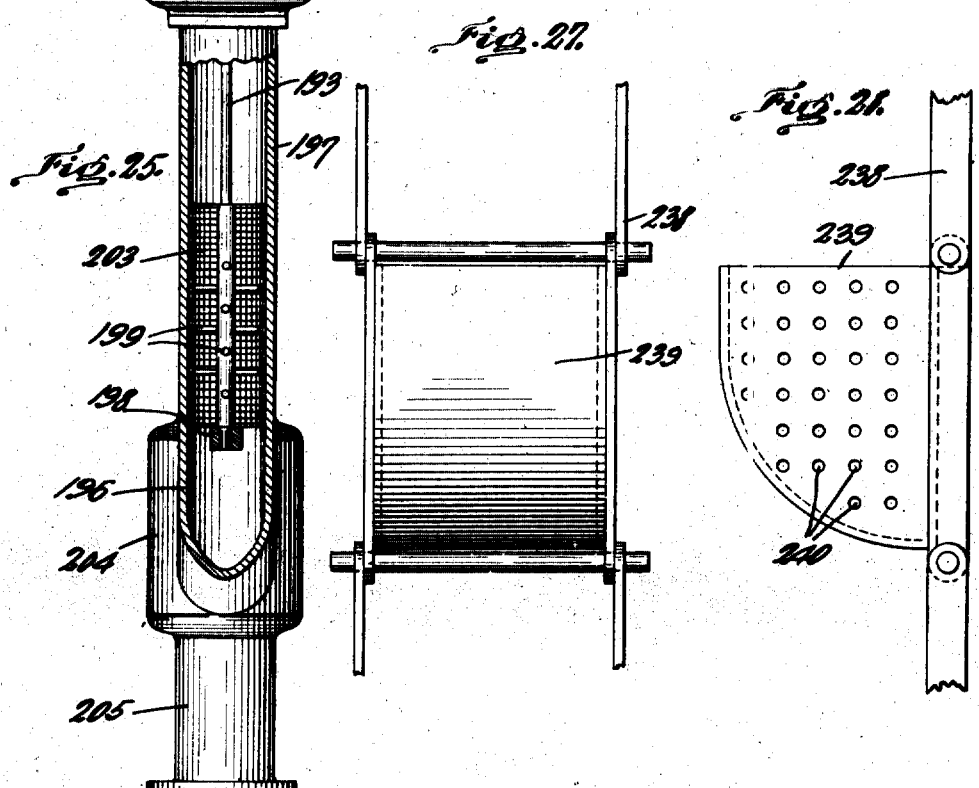
Witnesses:
Inventor:
J. N. Wingett
by C. A. Snow & Co. attys

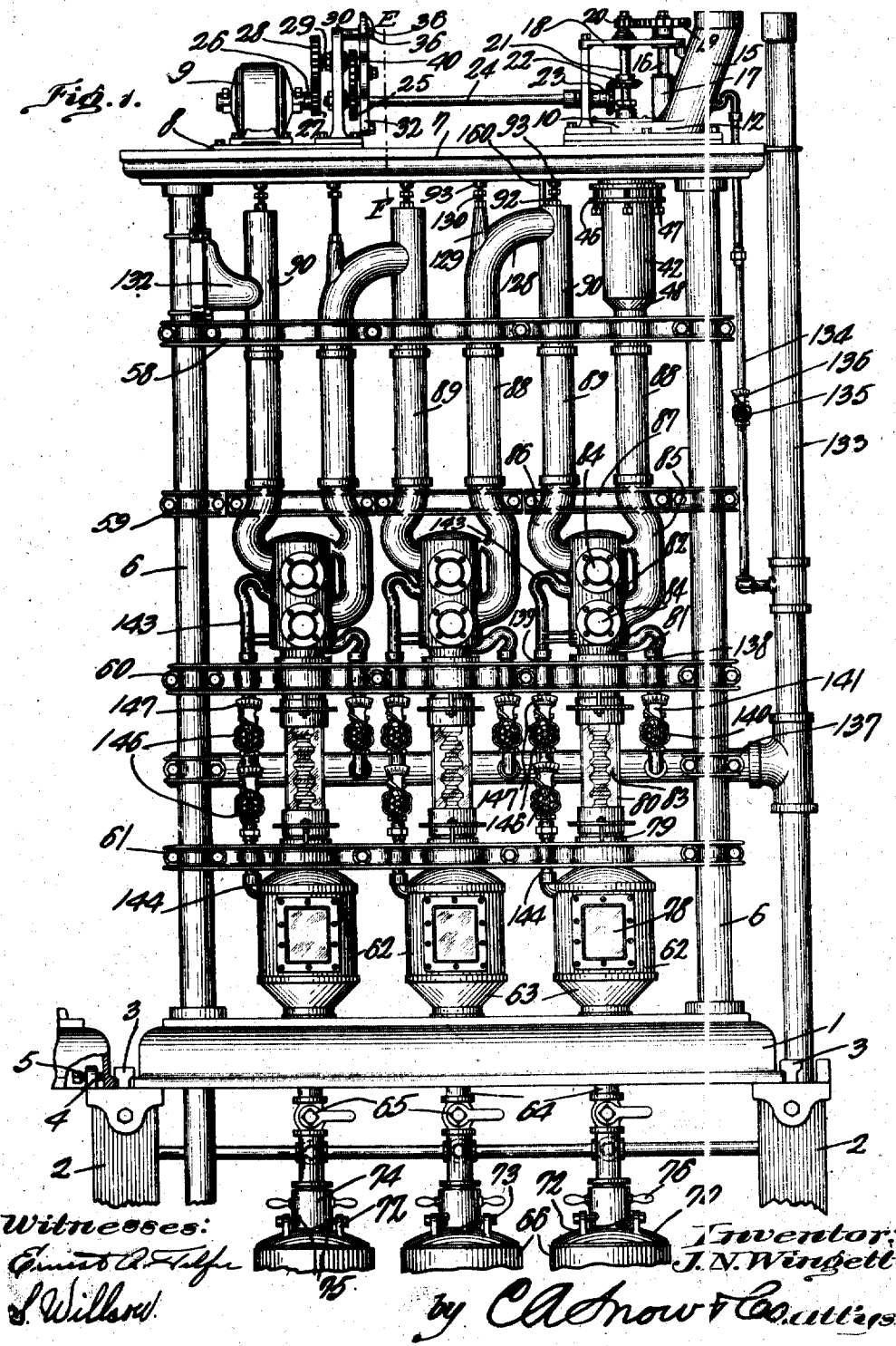

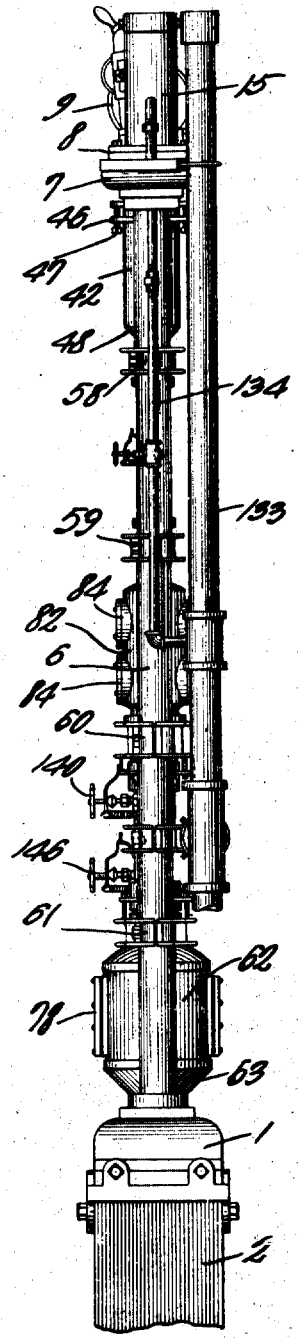

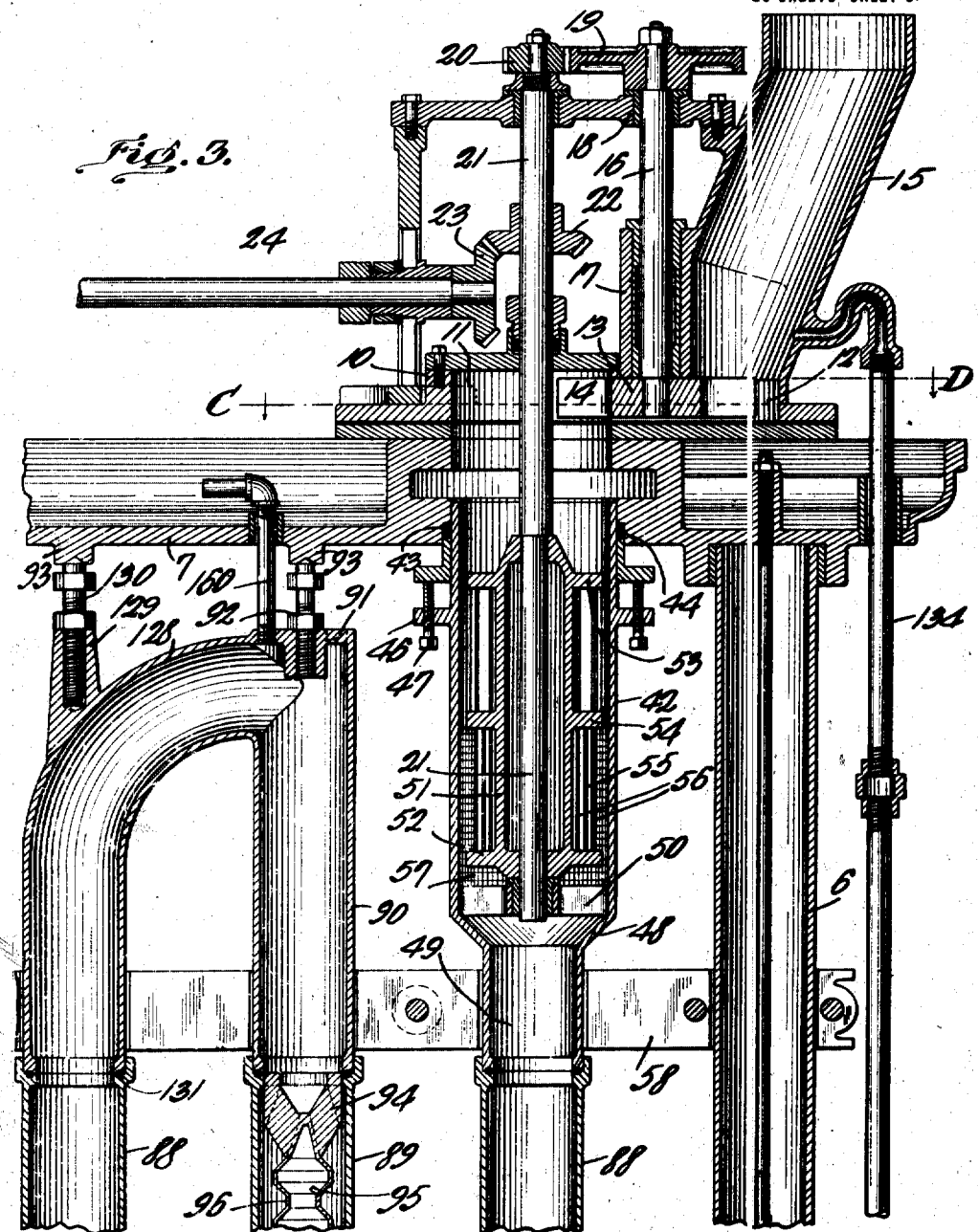

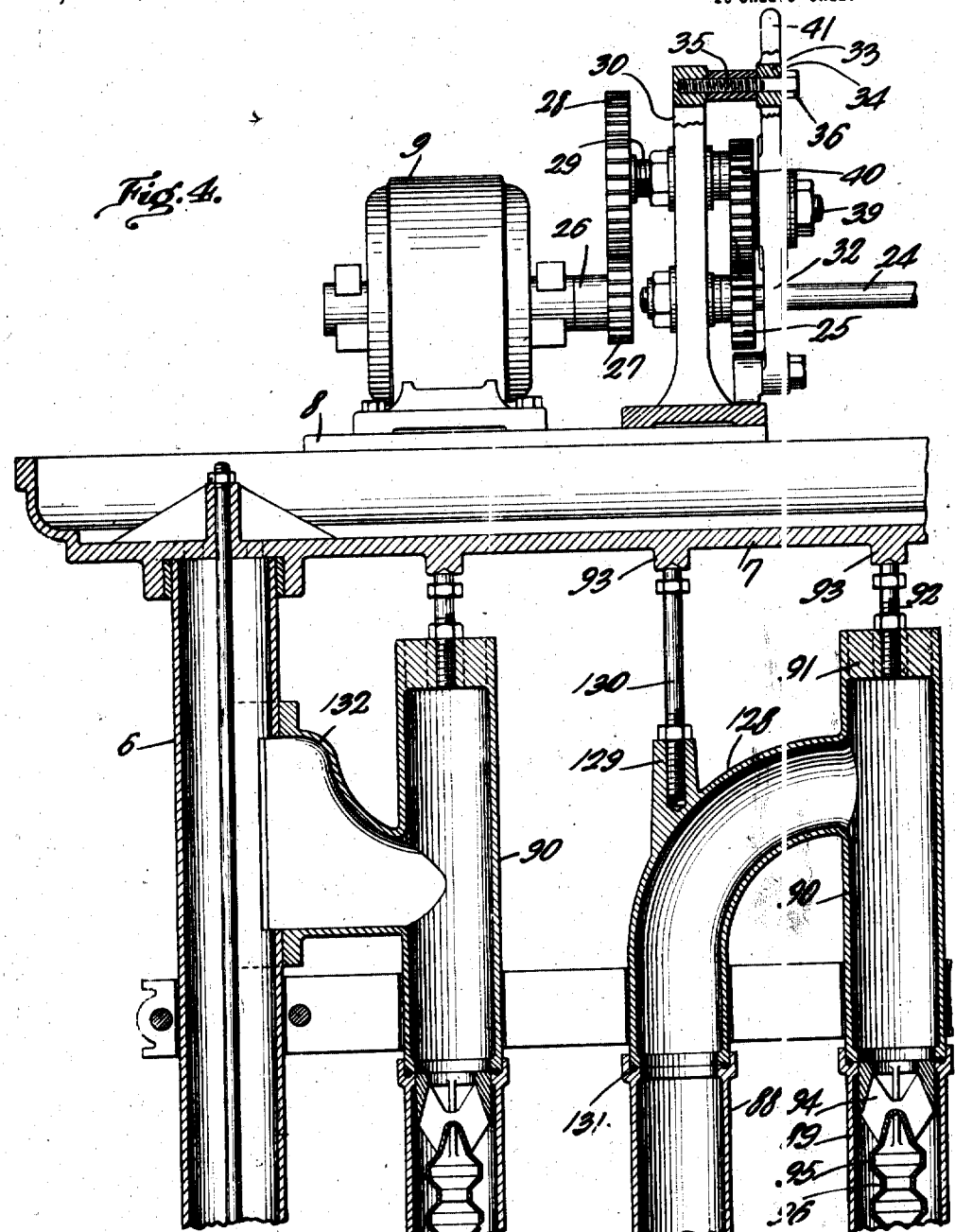

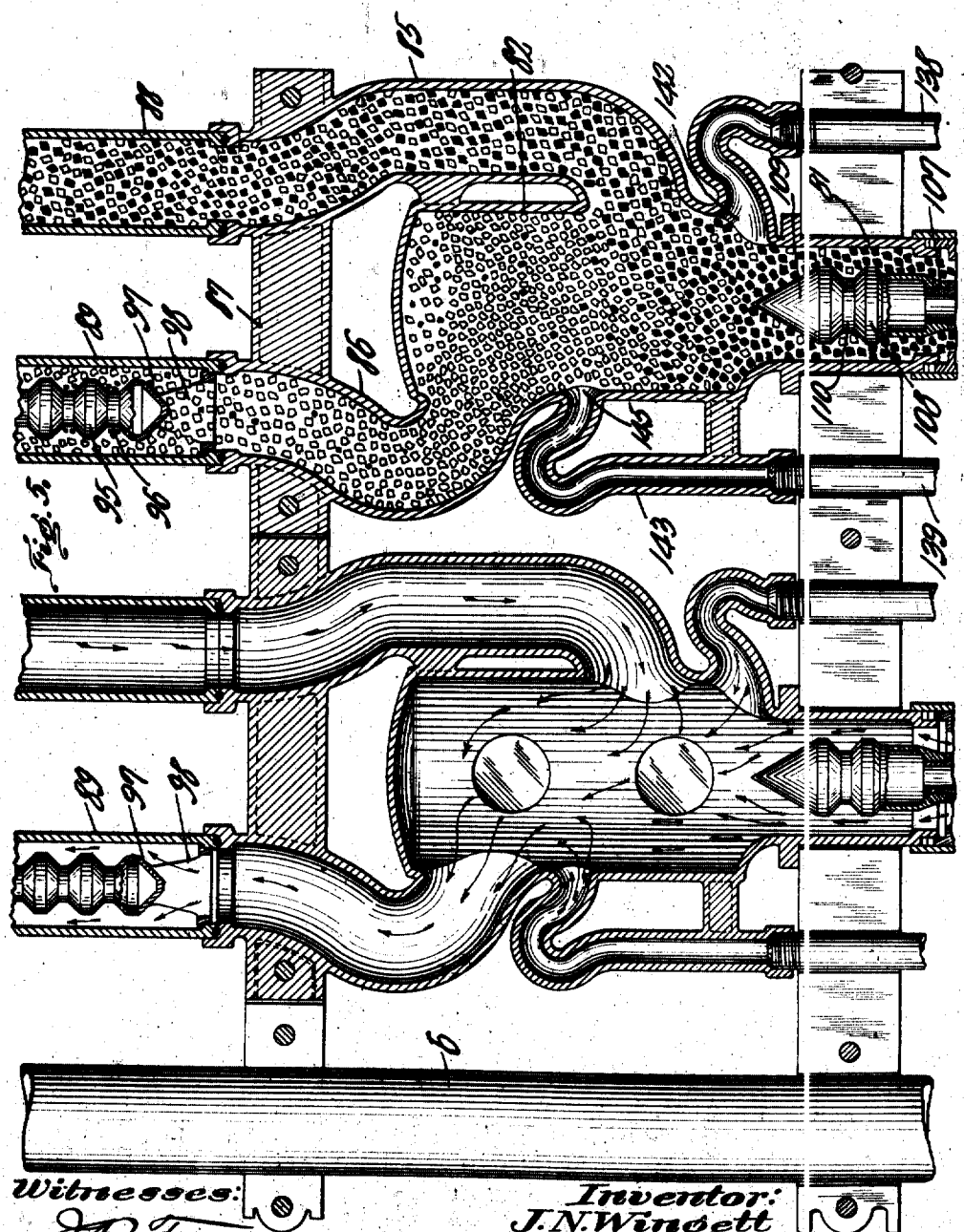

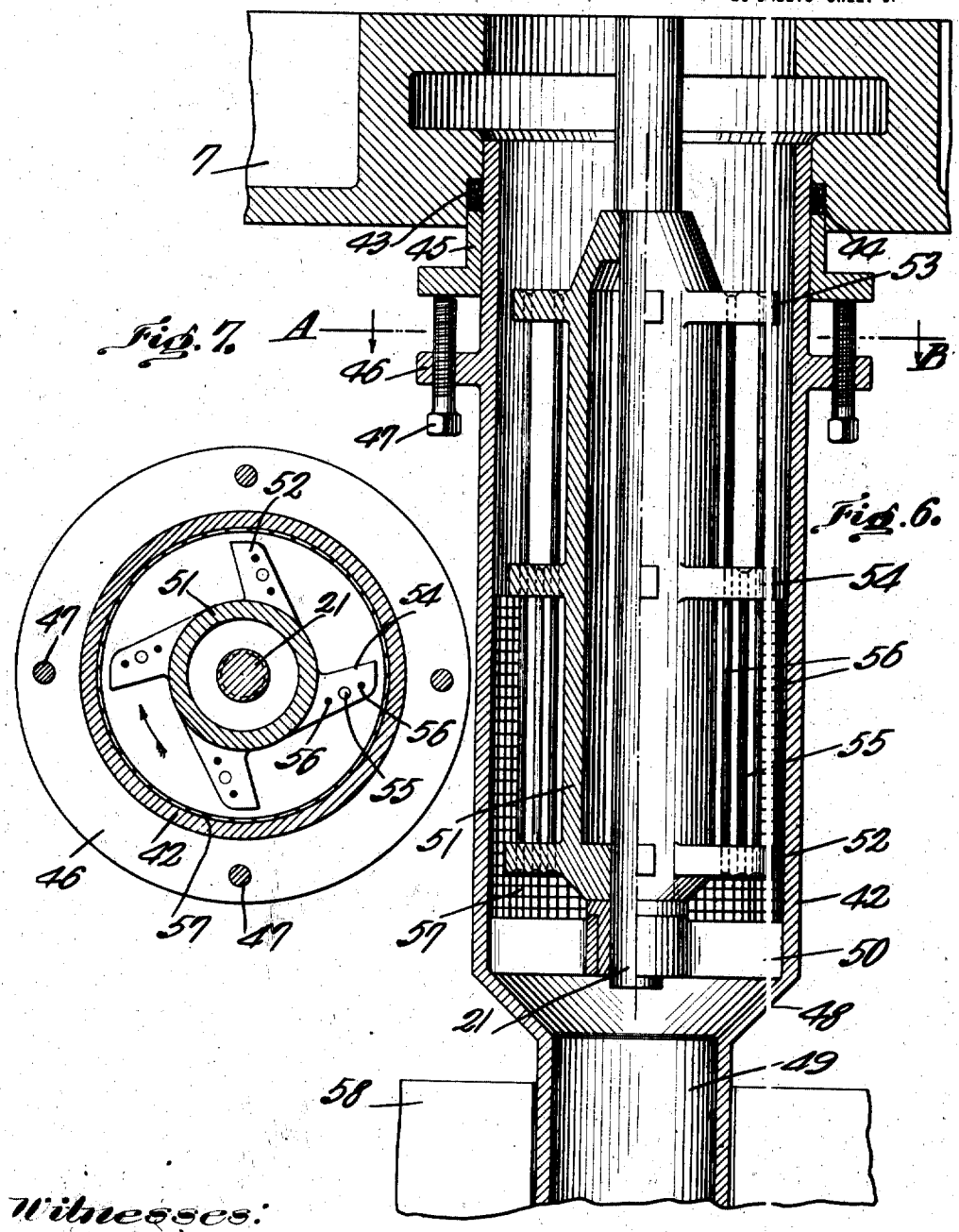

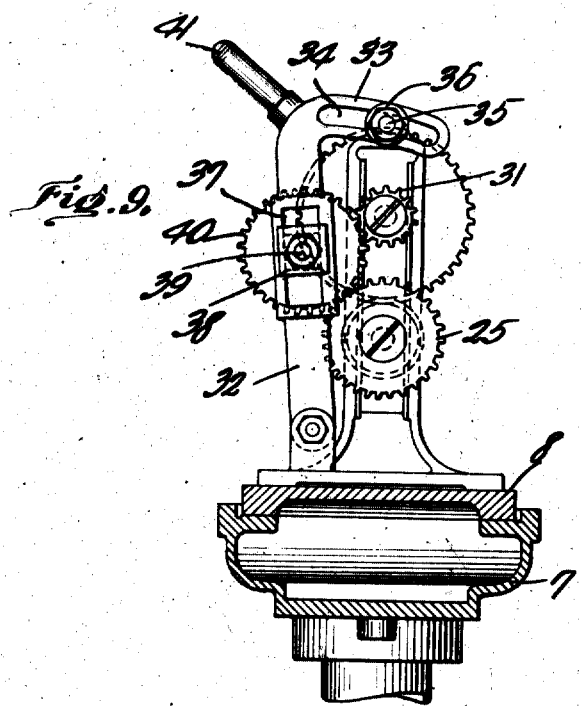
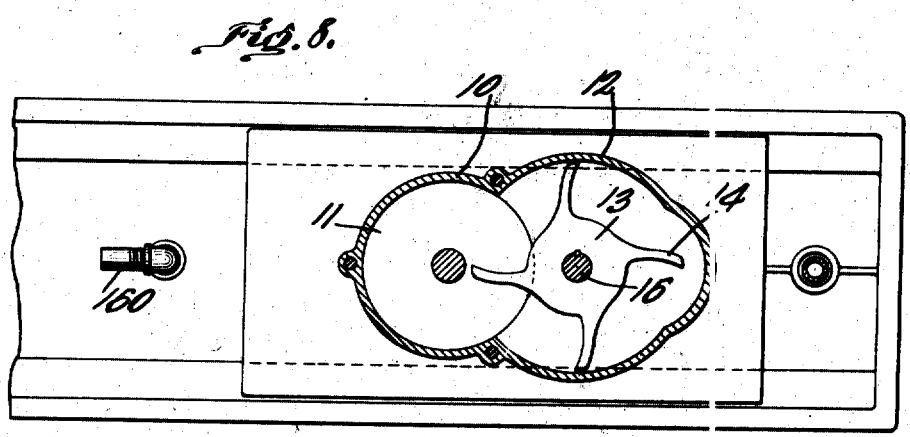

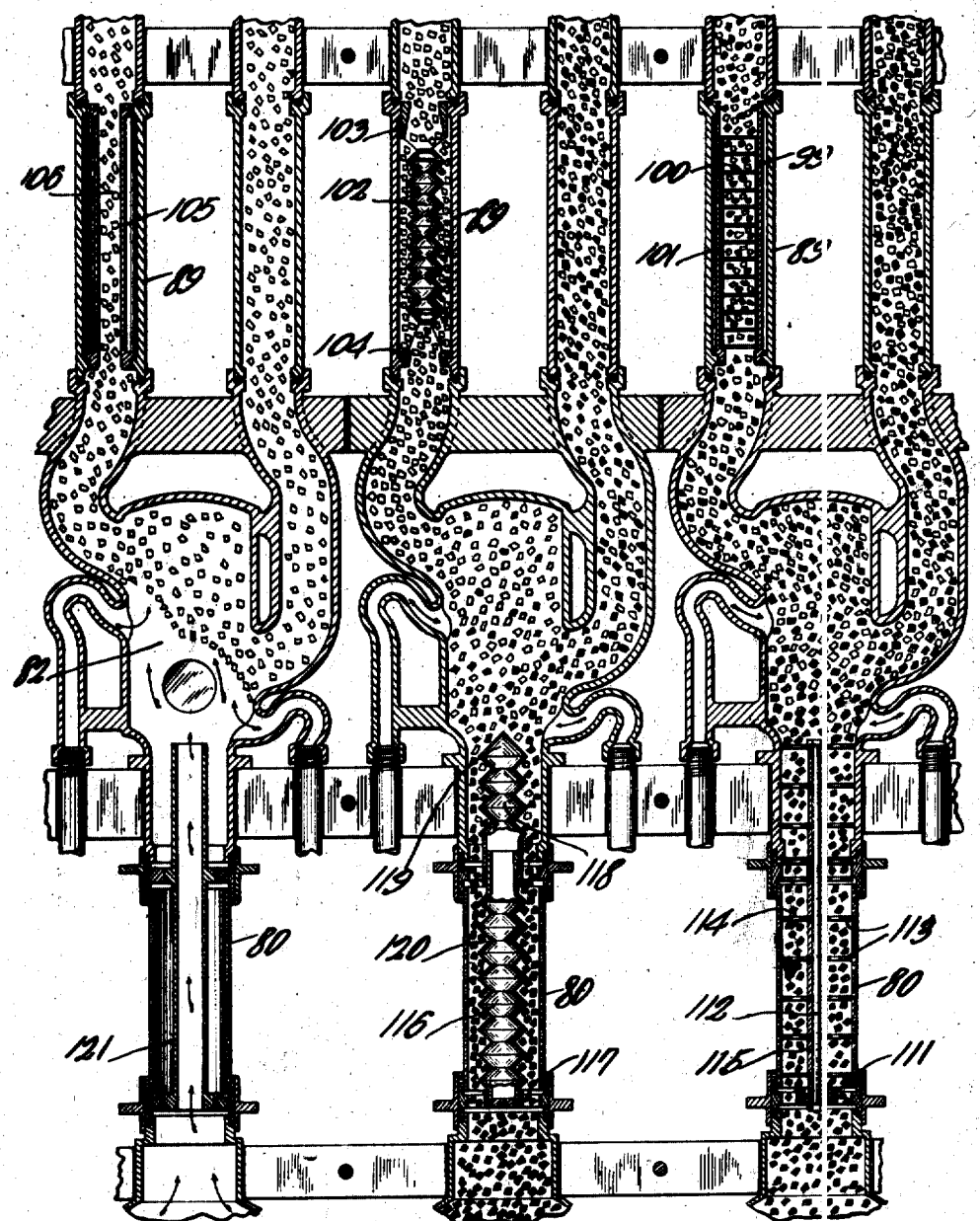

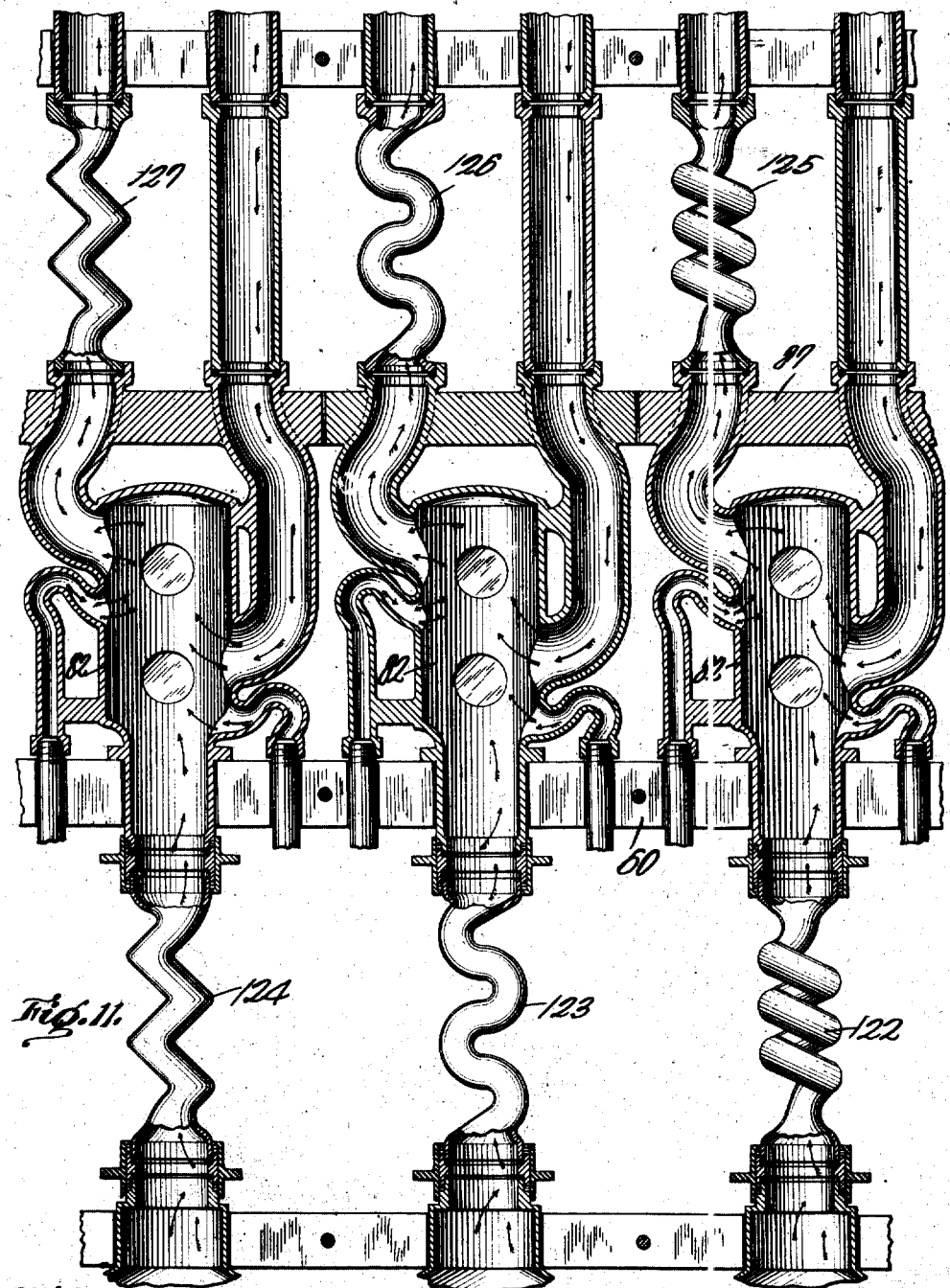

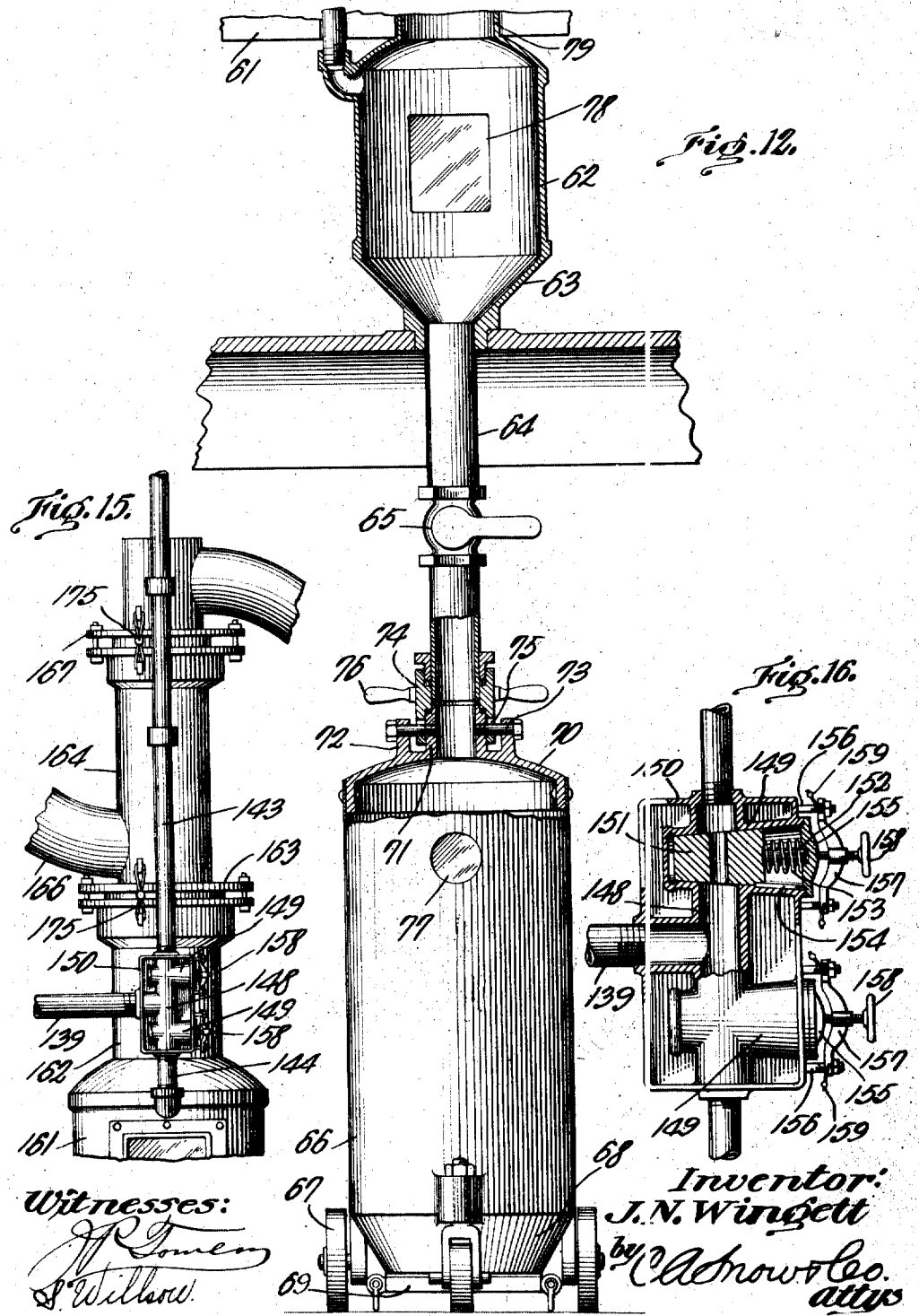

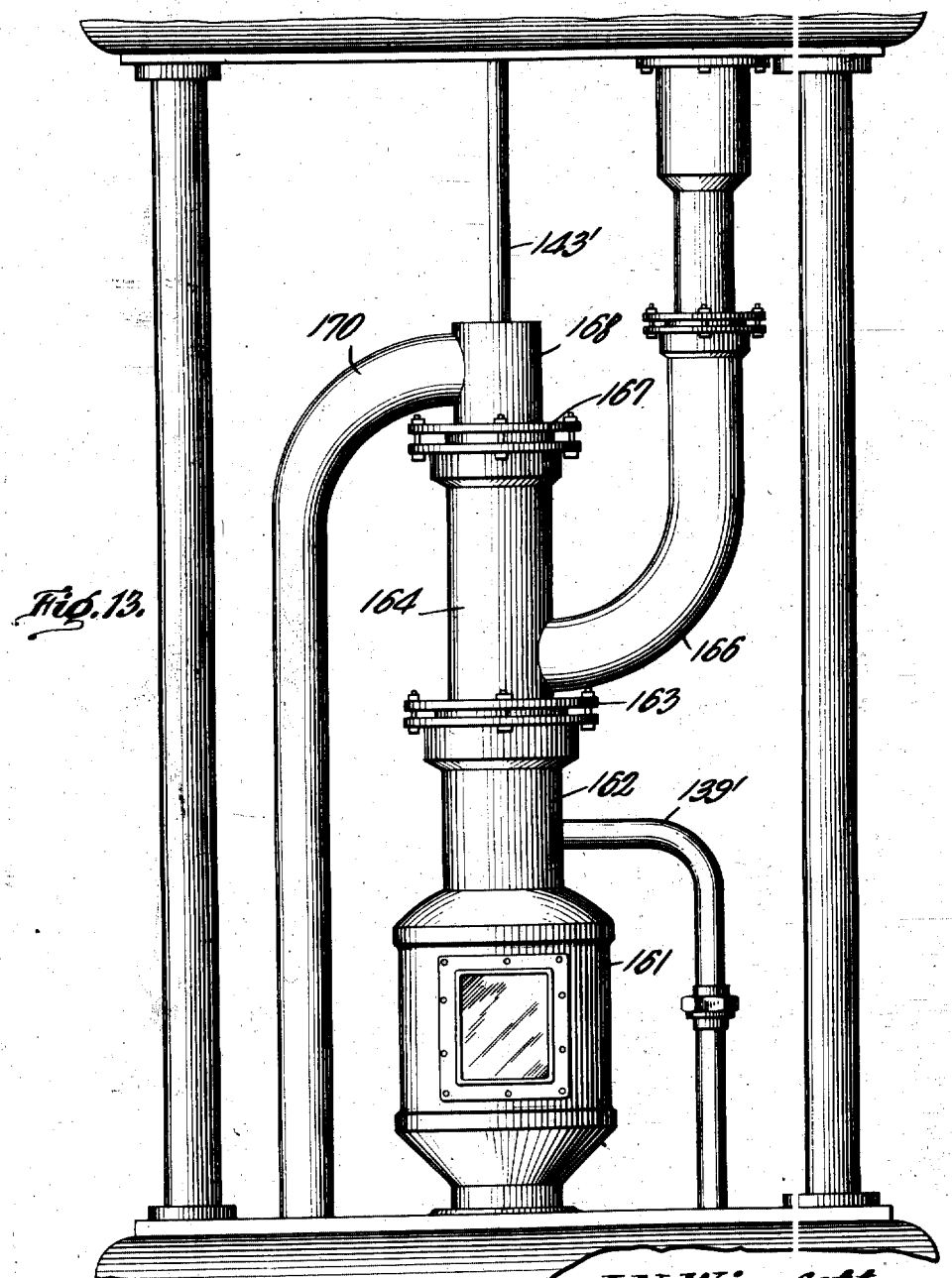

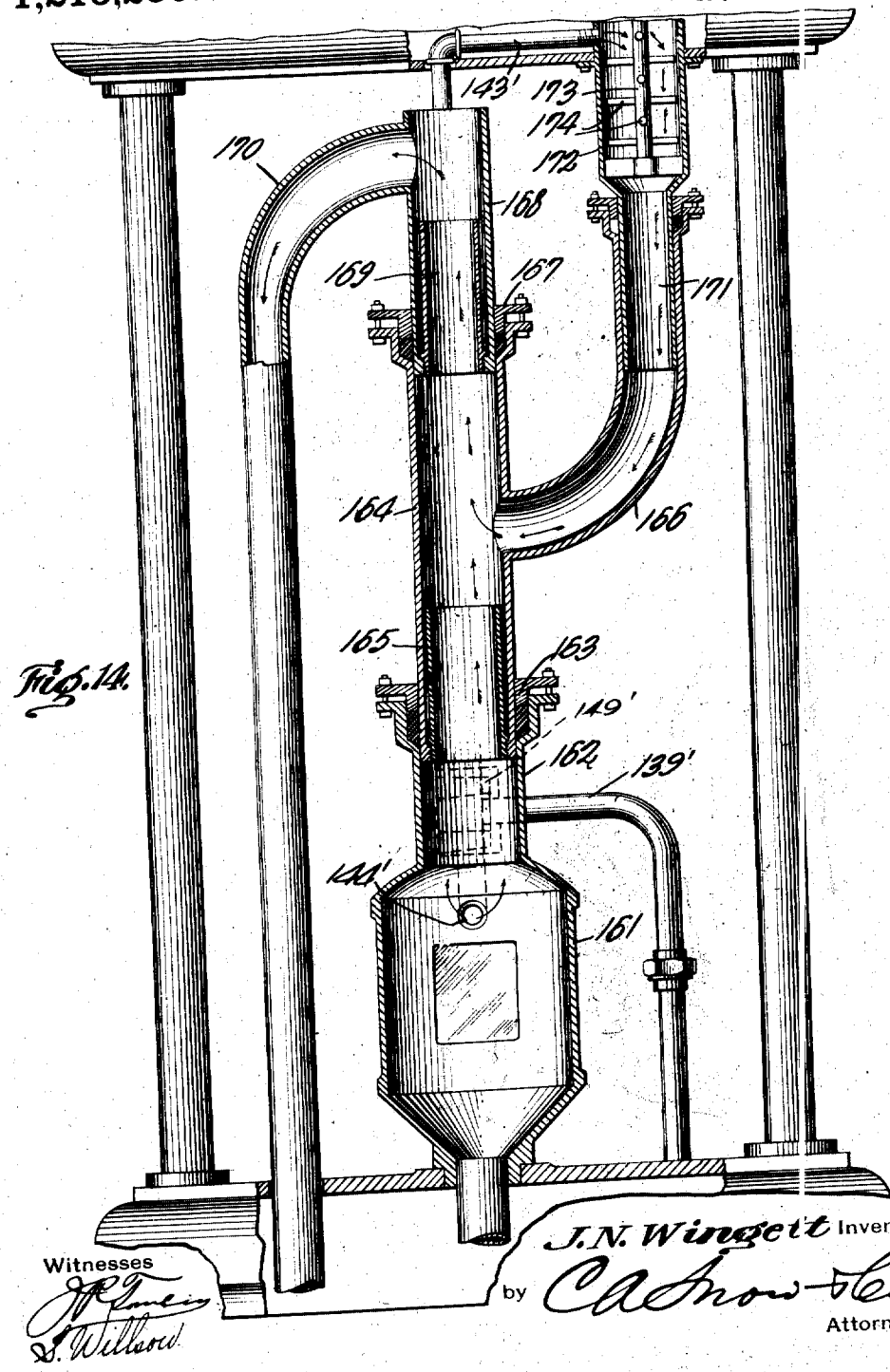

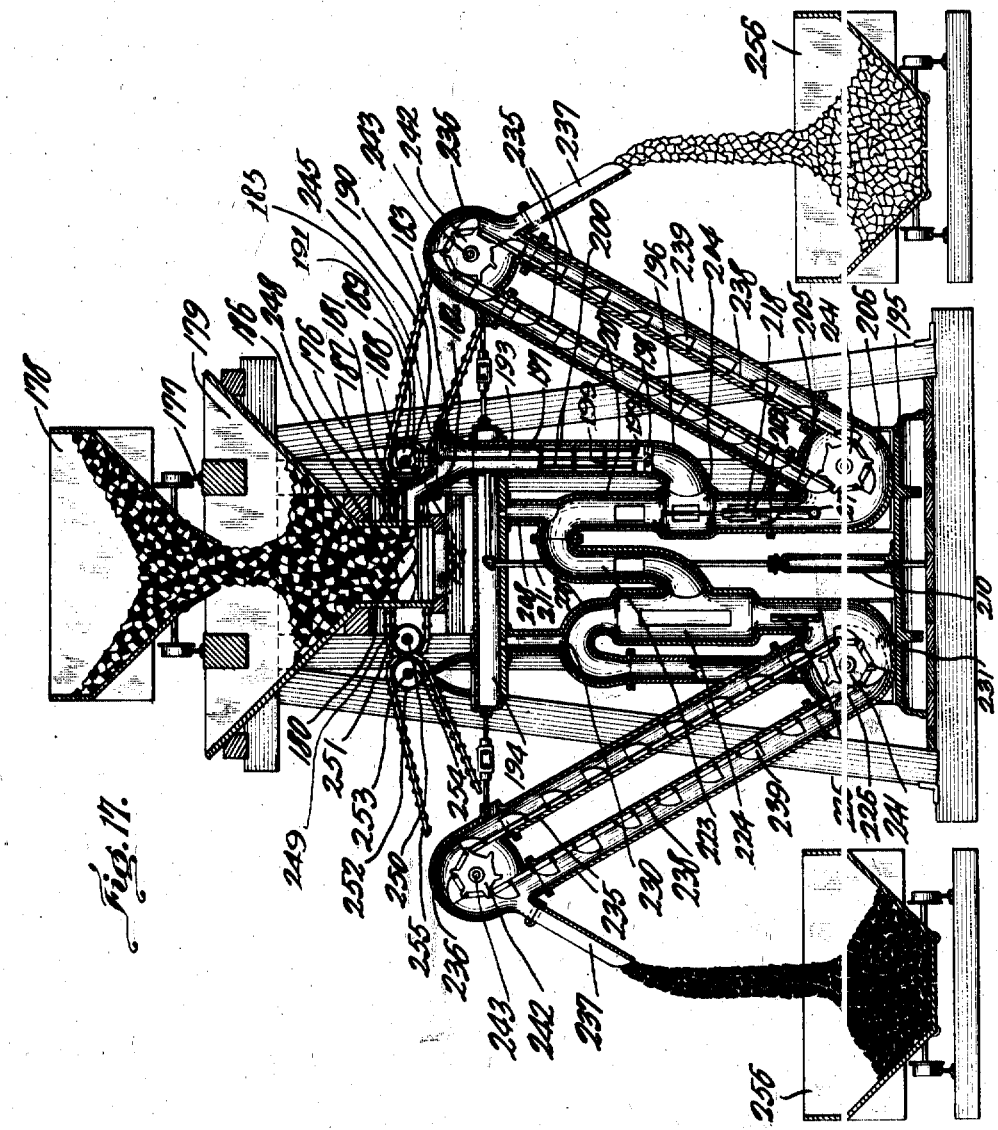

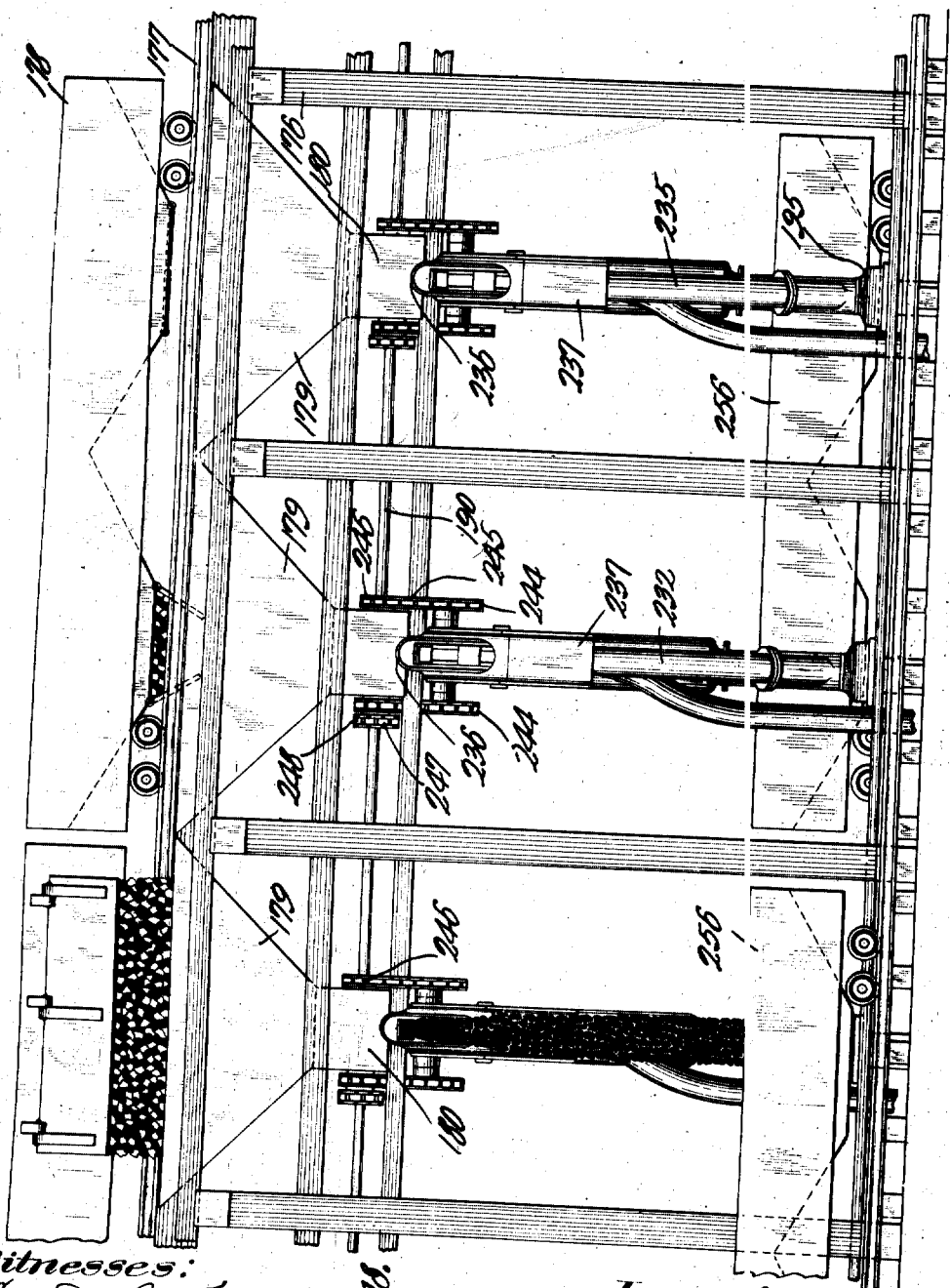

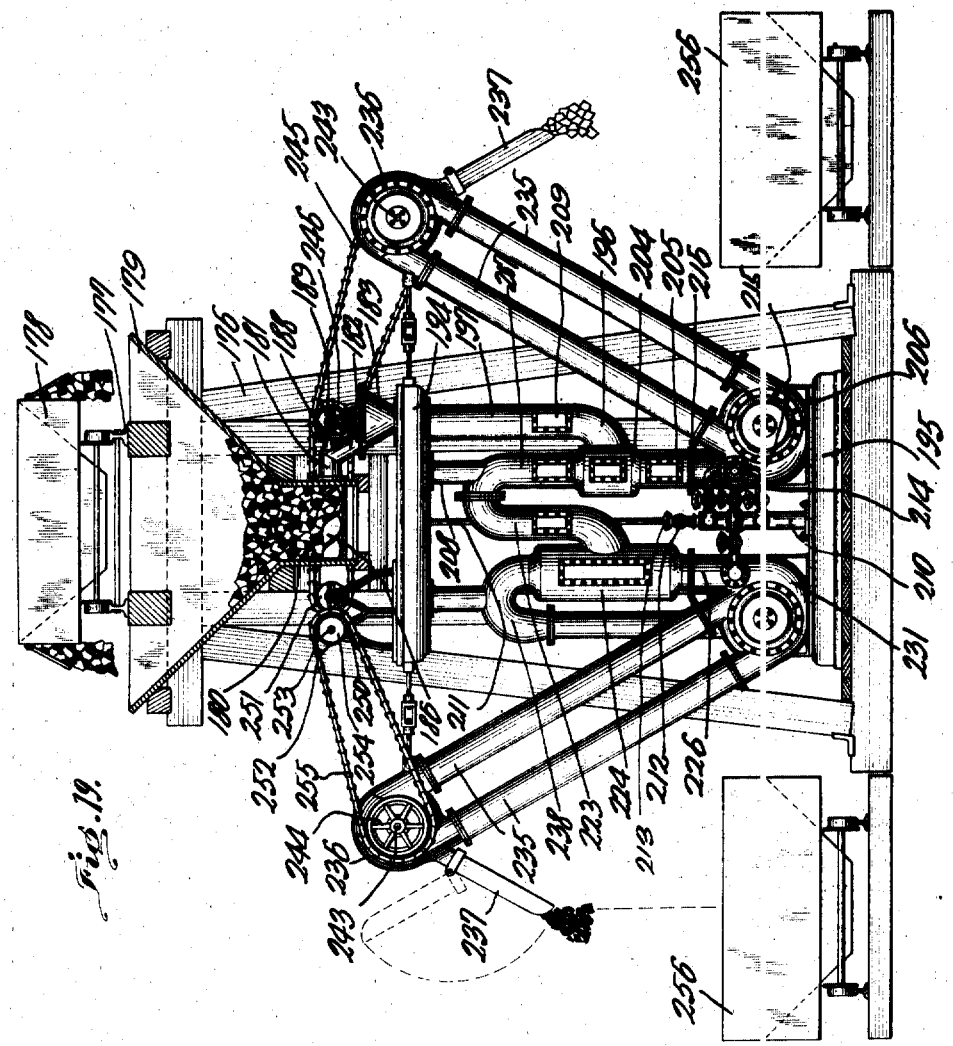

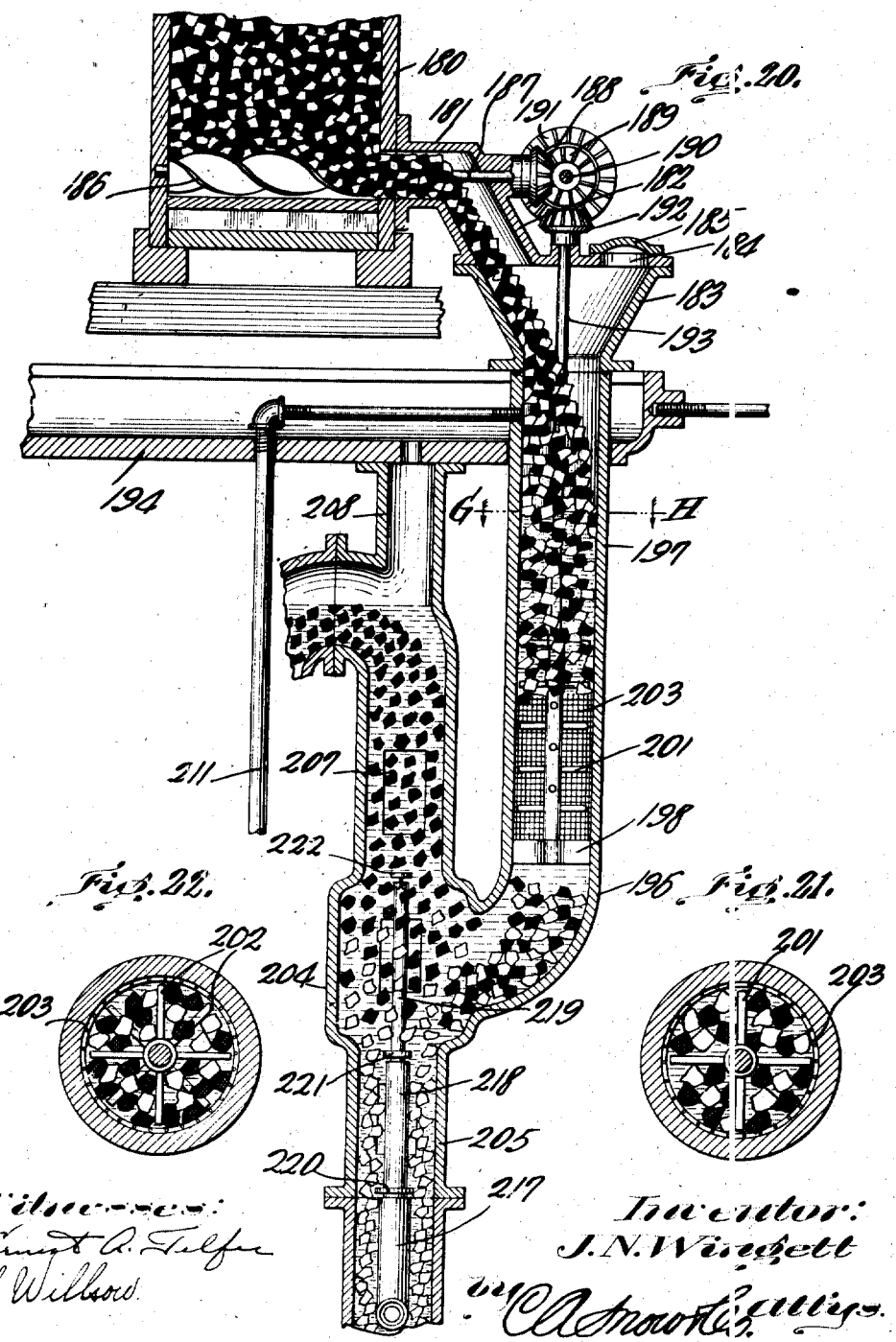

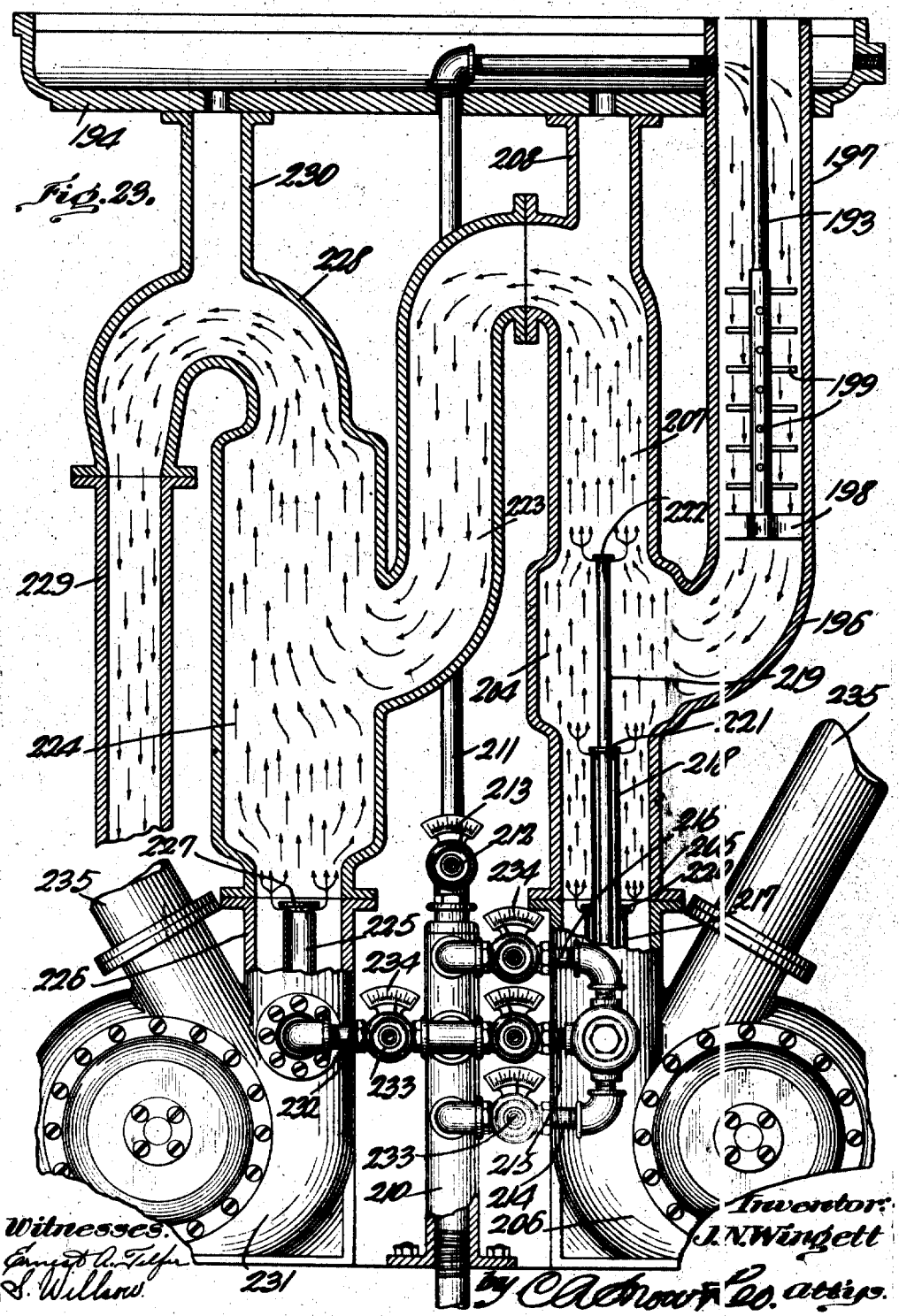

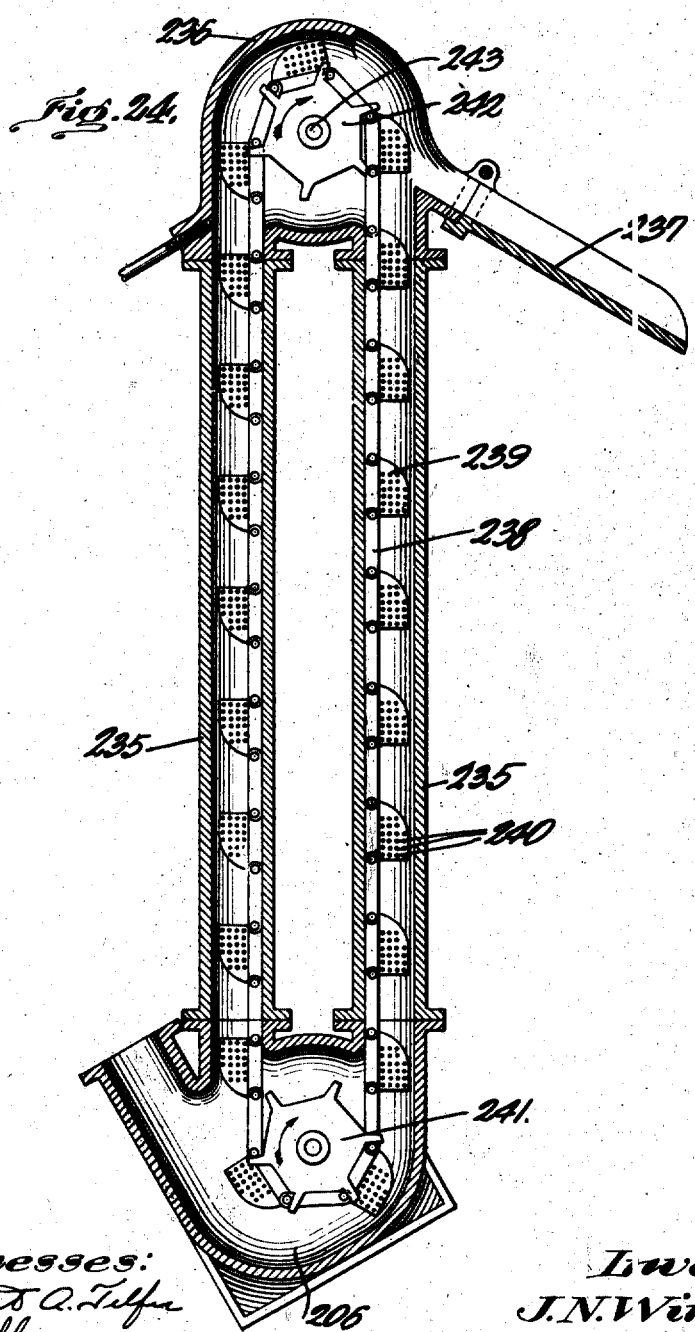

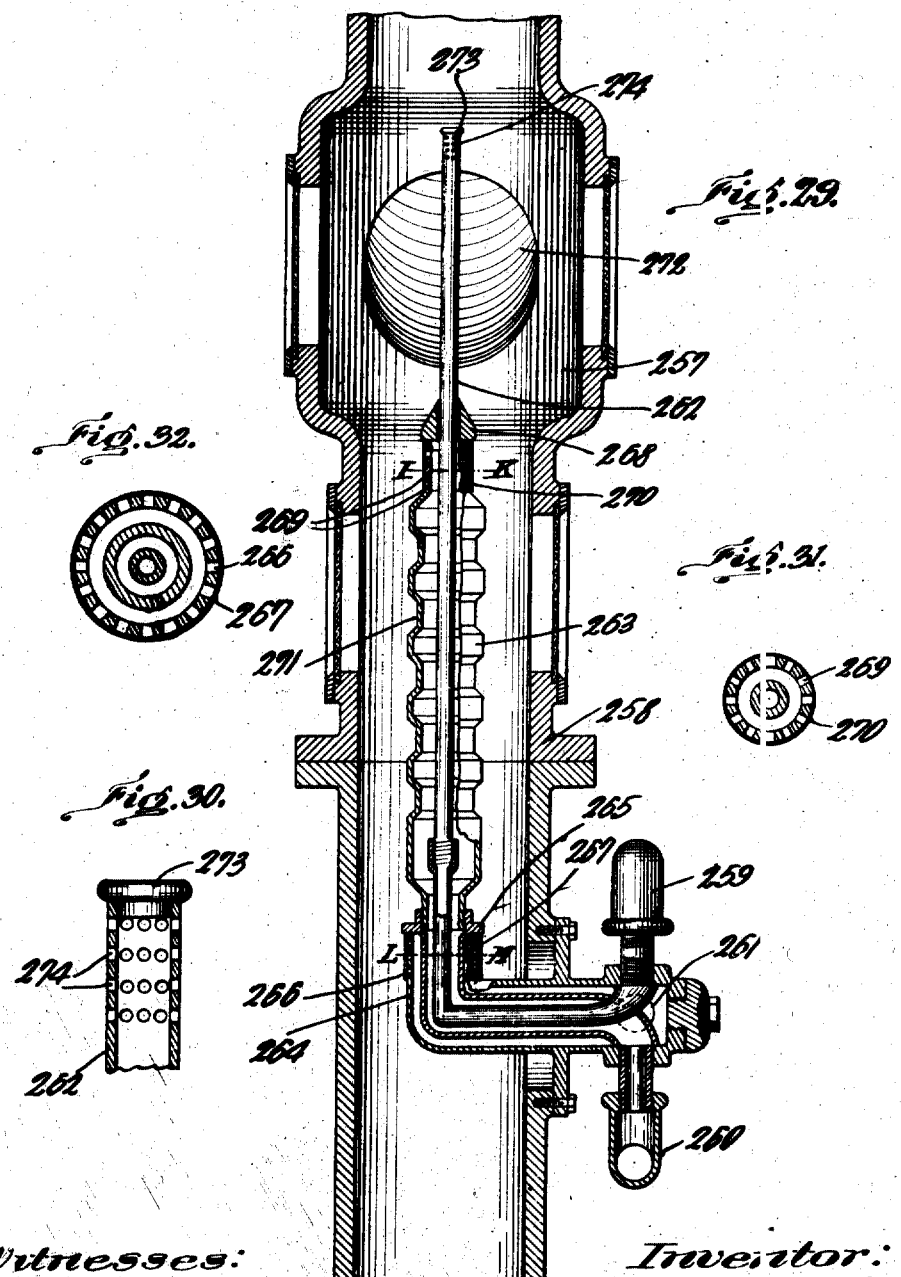

UNITED STATES PATENT OFFICE.

JOHN N. WINGETT, OF DENVER, COLORADO.

ORE CLASSIFIER OR SEPARATOR.

1,215,230.   Specification of Letters Patent.   Patented Feb. 6, 1917.

Application filed June 16, 1913. Serial No. 774,073.

*To all whom it may concern:*

Be it known that I, JOHN N. WINGETT, a citizen of the United States, residing at Denver, in the county of Denver and State of Colorado, have invented a new and useful Ore Classifier or Separator, of which the following is a specification.

This invention relates to apparatus for use in the classification or separation of values of different specific gravities by the use of a continuously moving body of fluid, usually water, it being designed to subject the values successively to lifting currents of different velocities whereby during the successive stages of the operation, the heaviest components of the material being separated will be precipitated during the first step of the operation, the next heaviest during the second step, etc., this procedure being followed throughout the passage of the material through the several units of the apparatus.

A further object is to effect an initial breaking up or separation of the particles forming the bulk to be acted upon, these particles being thoroughly moistened so that all parts of the surfaces thereof will be thoroughly saturated and all air removed therefrom prior to the admission of the material to the first unit of the separating apparatus, thus insuring against any faulty separation which might result from the action of the separating currents upon particles of the same grade but which are not uniformly moistened.

A further object is to so direct the material into each separating unit, that it will be discharged substantially horizontally across the upwardly or vertically moving elevating current used as a separating medium, thus insuring thorough spreading of the material across the current and at the same time preventing the material from being projected downwardly against the action of the lifting current as the result of any momentum which may be imparted to the material while being fed downwardly into the separating unit.

A further object is to subject the material in each unit successively to the action of separating currents disposed at different elevations, certain of these currents constituting means for thoroughly agitating the material being elevated, thus rendering more efficient the separating action of the currents.

Another object is to subject the values in each unit to the action of an elevating current or column flowing directly from a collecting chamber upwardly to a settling chamber which is located below the feed opening or inlet, the settling chamber being provided with means whereby any particles lighter than those to be precipitated into the collecting chamber, will be held in suspension and ultimately forced upwardly to be carried farther into the apparatus for precipitation with particles of the same grade.

A further object is to combine with each unit of the separating apparatus a means for directing an agitating jet into the values directly under their point of admission to the unit so that the said agitating jet not only performs its functions of breaking up and scattering the material to be separated, but also assists the separating column in exerting an upward pressure upon the material.

Another object is to provide means whereby the values are supplied to the agitating chamber and feed tube in any predetermined quantity so as to maintain the values at a predetermined proportion to the separating medium used in the units of the apparatus, the said feed tube and agitating chamber being sealed at its upper end by the feeding means.

A further object is to provide each unit with a separating chamber which is elongated vertically, thus to permit the use of lower and upper separating jets for assisting in elevating the values acted upon by a lifting column.

A further object is to provide each unit with a settling chamber and a supplemental separating chamber, each of these chambers having means for reducing the transverse area of the current passing therethrough so as thus to increase the velocity of the current above that of the current at its point of admission to the chamber.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 1 is a front elevation of the separating apparatus designed especially for effecting the separation of values the specific gravities of which do not widely differ, the receptacles employed for receiving the collected values from the respective units, being broken away.

Fig. 2 is a side elevation of the structure shown in Fig. 1.

Fig. 3 is an enlarged vertical section through the inlet portion of the apparatus.

Fig. 4 is a vertical section through the upper outlet portion of the apparatus.

Fig. 5 is a vertical section through the separating compartments of certain of the units of the apparatus and illustrating the action of the separating currents and of the values acted upon thereby.

Fig. 6 is an enlarged vertical section through the agitating means for acting upon the values prior to their admission to the first separating unit.

Fig. 7 is a section on line A—B Fig. 6.

Fig. 8 is a section on line C—D Fig. 3.

Fig. 9 is a transverse section through the structure shown in Fig. 1, said section being taken on the line E—F and showing adjustable means for transmitting motion from the drive motor to the feed mechanism.

Fig. 10 is a vertical section through the units of the apparatus and showing modified means for effecting suspension of particles between the separating chamber and the collecting chamber and between said separating chamber and the next succeeding unit.

Fig. 11 is a view similar to Fig. 10 and showing another means for retarding the action of the values to effect separation thereof according to their specific gravities.

Fig. 12 is an enlarged view partly in section and partly in elevation of the settling chamber and of the means for directing values therefrom into a receptacle in which the values are to be removed.

Fig. 13 is an elevation of a modified form of unit particularly designed for effecting the rapid separation of two kinds of material.

Fig. 14 is a vertical section through the apparatus shown in Fig. 13.

Fig. 15 is a side elevation of a portion of the apparatus shown in Figs. 13 and 14 and illustrating a controlling valve for use in regulating the amount of separating fluid directed into the settling compartment and the agitating compartment respectively.

Fig. 16 is an enlarged view partly in section and partly in elevation of the valve structure shown in Fig. 15.

Fig. 17 is a vertical transverse section through separating apparatus embodying the present improvements and designed particularly as a means for separating two kinds of material such, for example, as coal and slate, there being illustrated also means for feeding the material to the separator and for disposing of it upon the completion of the separation.

Fig. 18 is a side elevation of the apparatus shown in Fig. 17.

Fig. 19 is a front elevation of the said apparatus, the feed hopper being shown in section.

Fig. 20 is an enlarged vertical section through the feed portion of the apparatus and showing the agitating means and the interior of a portion of one of the separating units.

Fig. 21 is a section on line G—H Fig. 20.

Fig. 22 is a view similar to Fig. 21 but showing a slightly modified form of agitator.

Fig. 23 is an enlarged vertical section through the separating units and showing the action of the lifting or separating currents, the housings of the elevators being shown in elevation.

Fig. 24 is an enlarged vertical section through one of the elevator housings and showing the elevator in elevation.

Fig. 25 is a side elevation of one of the units of the separator, the agitating chamber being shown in section.

Fig. 26 is an enlarged vertical transverse section through a portion of the feed hopper.

Fig. 27 is an enlarged side elevation of one of the elevator buckets.

Fig. 28 is an enlarged front elevation of said bucket.

Fig. 29 is an enlarged section through a portion of a modified form of separating unit.

Fig. 30 is an enlarged section through the upper nozzle used in connection with said unit.

Fig. 31 is a section on line I—K Fig. 29.

Fig. 32 is a section on line L—M Fig. 29.

As hereinbefore pointed out the separator constituting the present invention is designed for separating any two or more solid materials of different specific gravities, the separation being effected through the medium of a continuously moving body of water or other separating fluid designed to travel at different velocities, it being apparent that the swifter moving portions of the separating medium will operate to lift greater weights than slower moving portions. In the apparatus used by me various devices are employed for increasing and reducing the velocity of the separating medium. Some materials require apparatus of one form while other materials require other forms of apparatus in order to obtain the most efficient results, it being necessary, in all forms, to thoroughly saturate the bulk of the material to be separated; to thoroughly agitate this bulk so as to break it up into particles, this saturation and agitation removing all air from the values; to direct the particles horizontally into a separating chamber where it is subjected to the action of an elevating column and to the action of supplemental spreading and elevating jets; and to provide a novel arrangement of baffles whereby any particles moving out of their proper courses will be held in suspension and brought ultimately to their proper positions in the apparatus.

Of the different forms of apparatus used by me, one has been illustrated in Figs. 1 to 9 inclusive. In these figures the base of the apparatus has been indicated at 1, said base being mounted upon suitable supporting structures 2 and preferably hollow as shown. One way of attaching the base to each supporting structure is to provide a central jaw 3 upon the top of the supporting structure so that one edge of the base 1 can abut therengainst. An ear 4 may be extended from the structure 2 and into the base, this ear carrying a clamping bolt 5 designed to engage the inner surface of the wall of the base and to bind the said base against the jaw 3. Obviously, however, other means may be provided for mounting the base.

In the structure referred to, three separating units are used and, as each unit is of practically the same construction as the remaining units, it will be necessary to describe only one of them in detail. It might be stated that all of these units are grouped preferably between standards 6 supporting a top 7 which, as shown particularly in Fig. 9, is hollow and has a top plate 8 on which a motor 9 is mounted. There is also mounted on this top plate 8 above the first unit of the apparatus, a housing 10 extending around an outlet opening 11 and provided with an extension 12 in which a feed wheel 13 is mounted for rotation, this feed wheel, as shown in Fig. 8, having outstanding fingers 14 designed to gather material and scrape it from the interior of extension 12 to the opening 11. Although this structure enables the values to be fed to the opening 11 in predetermined quantities, it also seals the said opening so that it is not possible for any water or values to escape upwardly past the feed wheel. This extension is located under the discharge end of a supply tube 15 mounted on or formed integral with the housing 10. Wheel 13 is secured to the lower end of a shaft 16 journaled in suitable bearings 17 and 18 provided therefor, the upper end of this shaft carrying a gear 19 adapted to receive motion, from a much smaller gear 20 secured to the upper end of an agitator shaft 21. This agitator shaft is journaled in the top of housing 10 and extends through the center of opening 11. A gear 22 receives motion through a gear 23, from a horizontal shaft 24 located above the top plate 8 and in turn receiving motion through an arrangement of gears, from the motor 9.

As shown in Figs. 1 and 9 shaft 24 has a gear 25 and the shaft 26 of motor 9 has a gear 27, this last named gear meshing with a gear 28 secured to a short shaft 29 journaled in a standard 30. Another gear 31 is secured to shaft 29. For the purpose of transmitting motion from gear 31 to gear 25 a lever 32 is mounted upon the top plate 8 close to standard 30 and has a rearwardly extending portion 33 formed with an arcuate slot 34, this slot receiving a clamping bolt 35 engaged by a nut 36 which, when tightened, serves to hold the lever 32 at any desired angle to the horizontal. Furthermore lever 32 has a longitudinal slot 37 in which a block 38 is adjustably mounted, this block carrying a short shaft 39 on which is journaled an intermediate gear 40. This gear meshes with both of the gears 25 and 31. The gear 40 is detachably mounted on shaft 39 and by substituting a larger or a smaller gear therefor, and shifting lever 32 so as to bring the substituted gear into mesh with gears 25 and 31, the speed of rotation of shaft 24 can be varied as desired. A handle 41 is extended from lever 32 and by means thereof the said lever can be easily shifted so as to move gear 40 into and out of mesh.

Seated in the lower portion of the outlet opening 11 is the upper end of the agitating chamber 42, the lower end of the opening 11 being counter bored, as at 43, so as to receive packing 44 and also to receive the upper end of a collar 45. A flange 46 extends outwardly from the agitating chamber 42 and carries binding screws 47 which bear against the collar 45 and thus serve to press the collar against the packing 44 and, in turn, push the agitating chamber downwardly.

As shown in Fig. 3 the lower end of the agitating chamber 42 is tapered downwardly, as at 48, to a cylindrical outlet 49. A spider 50 is arranged within the lower portion of the chamber 42 and constitutes the bearing for the lower end of shaft 21. Secured to this shaft and extending close to the spider 50 is an elongated hub 51 having tangential arms 52 extending from the lower end portion thereof and similar arms 53 extending from the upper end portion thereof. Intermediate arms 54 corresponding with arms 52 and 53 are extended from the hub and are connected to the arms 52 by parallel rods 55 mounted on the middle portions of the arms. Additional rods 56 extend from the lower arms 52 through arms 54 to the upper arms 53. Thus three rods are provided between every two arms 52 and 54 while only two rods connect each arm 53 to the corresponding arm 54. The lower portion of the agitating chamber 42 is lined with a coarse metal fabric 57 constituting a retarding surface for engagement by the material being agitated, this surface obviously coöperating with the rotating agitator made up of hub 51 and the parts connected thereto, to thoroughly break up or separate particles of different values which might otherwise adhere throughout the separating operation and thus render such operation imperfect.

The reduced outlet end of the agitating chamber is mounted within a cross connection or beam 58 supported at its ends by the standards 6, this beam being formed preferably of two opposed members bolted together so as to bind upon the standards and also to bind upon and support the upper portions of the various units arranged between the standards. In this connection it might be stated that several cross connections are employed for engaging and supporting different parts of the units, the additional connections being indicated at 59, 60 and 61.

Mounted upon the base 1 is a series of collecting chambers 62, one of these being provided for each unit. Each collecting chamber has a conical bottom 63 opening into a draw-off tube 64 provided with any desired form of valve 65 whereby escape of material from the tube is prevented. A receptacle 66, which can be of the form shown in Fig. 12, is adapted to be brought to position under the tube 64. As shown in said figure this receptacle is mounted on supporting wheels 67 whereby it can be moved readily from place to place and the bottom of the receptacle is preferably frusto-conical as shown at 68 so as to direct the contents of the receptacle through an outlet opening in the bottom thereof, said opening being normally closed by doors 69 of any suitable form. The upper end of receptacle 66 is closed by a head 70 having an inlet tube 71 adjacent which are disposed upstanding ears 72 connected to the tube by radial bolts 73. A coupling sleeve 74 is mounted for rotation on the depending tube 64 and is formed with inclined slots 75 in its lower edge adapted, when the sleeve is rotated, to receive the bolts 73. Grips 76 radiate from the sleeve 74 so as to facilitate the rotation of the sleeve. Obviously by rotating the sleeve in one direction the tube 64 will be coupled tightly to the head 70 and, by rotating the sleeve in the opposite direction, said head can be uncoupled from the tube 64 and the receptacle 66 withdrawn from under the tube to any desired point where the contents of the receptacle can be discharged. It will be noted that the receptacle 66 has a sight opening 77 provided with a transparent closure so that it can be easily determined when the receptacle is nearly filled. The collecting chamber 62 is likewise provided with a sight opening 78 having a transparent closure so that the contents of the chamber can be inspected whenever desired.

The collecting chamber 62 is provided with a reduced outlet 79 at its upper end, this tubular portion being engaged by the lower cross beam 61. This outlet 79 is coupled in any suitable manner to the lower end of the settling chamber 80 of the unit and the upper end of the settling chamber is coupled to the lower reduced end 81 of the separating chamber 82, said reduced portion 81 being mounted within the supporting beam 60. In order that the contents of the chambers 80 and 82 may be inspected whenever desired, transparent plates are provided, the settling chamber 80 being formed with a plate 83 and the chamber 82 being provided with upper and lower plates 84. In some structures however, the wall of the settling chamber can be formed entirely of glass or the like.

Opening into one side of the separating chamber 82 is a feed tube 85, the lower portion of this tube being curved inwardly so as to discharge the contents of the tube substantially horizontally into the chamber 82, thus to prevent the material from being projected downwardly within said chamber under the momentum resulting from the downward movement of the values within the tube 85. An outlet tube 86 extends from the upper portion of chamber 82 and is preferably connected to the tube 85 by a casting 87 formed integral with the tubes. The inlet of tube 86 is inclined upwardly and outwardly away from the separating chamber 82 and is located at a higher point than the lower end of tube 85. The two tubes extend from diametrically opposed portions of the separating chamber. A feed tube 88 is coupled to the reduced end of the agitating chamber 42 and also to the upper end of the tube 85.

Extending upwardly from the outlet tube 86 is a supplemental separating chamber in the form of a tube 89 to the upper end of which is connected a tubular extension 90 provided at its upper end with a spider 91 carrying a holding stud 92 which is adjustably mounted in the spider and bears upwardly against a node or projection 93 formed upon the bottom of the platform 7. Thus by adjusting the stud 92 it can be caused to force the extension 90 downwardly, and clamp together the several parts of the unit thereunder. If packing is placed between these parts leakage will thus be prevented.

Supported within the upper end portion of the supplemental separating chamber 89 is a substantially conical spider 94 formed integral with the upper end of an elongated baffle 95. This baffle is of circular cross sectional contour and preferably hollow and is provided at desired intervals with annular grooves 96 the upper and lower walls of which converge inwardly so that the passage formed around the baffle and longitudinally within the supplemental separating chamber 89 is of variable cross sectional area thus to produce variable velocity or pulsation of a current passing through the chamber. The lower end of the baffle is preferably conical as shown at 97 and is supported by a suitable bracket 98 mounted within the lower portion of the chamber 89.

While the baffle above described is especially desirable for use in connection with some materials to be separated it is to be understood that other forms of baffles may be arranged within the supplemental separating chamber. In Fig. 10 some modified structures have been illustrated. For example, in the chamber 89 of one of the units is arranged an inner tube 99 within which are located superposed apertured disks 100 held spaced by collars 101 resting upon the peripheries of the disks. Another form of baffle utilized for restricting the passage through the chamber 89 is an elongated member 102 circular in cross section and provided with superposed V-shaped annular grooves, the upper end of the baffle being held properly centered by a spider 103 while the lower end is held centered by a spider 104. Instead of utilizing any of the baffles hereinbefore described, a tube 105 may be mounted within the chamber 89 so that during the upward movement of the separating fluid, it will be caused to pass through the restricted passage 106 within the tubular baffle 105. While any one of the baffles herein described can be used in lieu of any one of the others it will, at times, be found desirable to use one kind of baffle in one unit and another kind in another unit for the reason that some baffles are more efficient when used in connection with some kinds of values while other baffles can be more efficiently used with other values. This arrangement has been illustrated in Fig. 10 wherein one unit is shown provided with a disk baffle, another unit is provided with a central imperforate baffle and a third unit contains a tubular baffle.

Supported within the settling chamber 80 is another baffle 107 which can be similar to the baffle 95 with the exception that instead of providing the upper end of said baffle 107 with a spider such as shown at 94, it may be formed with a head 108 having a conical upper end 109 and an annular groove 110 below said upper end. This head 108 can be detachably mounted. Furthermore instead of forming the baffle 107 in the shape shown in Fig. 5 and which is similar to that of the baffle 95, said baffle can be made of other forms certain of which have been illustrated in detail in Fig. 10. For example a spider 111 may be located in the lower end of the settling chamber 80 and a rod 112 may be extended upwardly therefrom. Disks 113 having apertures 114 are mounted on the rod 112 and are spaced apart by sleeves 115 mounted on the rod. Another form of baffle in settling chamber 80 can consist of an elongated member 116 which is imperforate and circular in cross section. The lower end of this member may be supported by a spider 117 while the upper end may be formed with a head 118 having a conical end 119. Head 118 may be detachably connected to the baffle 116 and both the head and the baffle are formed with annular V-shaped grooves 120 so that a passage of variable cross sectional area is provided within the settling chamber 80 and around the baffle. Another modified form of baffle in the settling chamber 80 has also been illustrated in Fig. 10 and is in the form of a tube 121 supported at its lower end within the bottom portion of the settling chamber and discharging at its upper end into the settling chamber 82, this tubular baffle 121 forming a restricted passage through which the separating medium and the particles carried thereby will flow at an increased velocity. It is to be understood that these baffles in the separating chamber are provided usually for different kinds of values, one form of baffle being better suited for one kind of value than is another form of baffle. Furthermore where a series of units is employed, it will often be found desirable to use in the settling chamber of one unit a baffle of one form and another kind of baffle in the settling chamber of another unit. This arrangement has been illustrated in Fig. 10.

By referring to Fig. 11 it will be seen that instead of arranging baffles within the settling chambers and the supplemental separating chambers of the units, the chambers themselves may be so shaped as to produce the desired separation of values during the passage of a column of water therethrough. For example the settling chamber can be made in the form of a spiral, as shown at 122, or can be waved, as shown at 123, or can be of zigzag form as shown at 124. The supplemental separating chambers can be similarly shaped, a spiral chamber being indicated at 125, a waved chamber at 126 and a zig-zagged chamber at 127. It has been found that by utilizing chambers shaped in the manner shown and described particles suspended by the separating medium flowing through the chambers will be subjected to varying sustaining forces in practically the same manner as where baffles are used and as will be hereinafter more fully pointed out.

It is to be understood that in a complete apparatus the castings 87 are to be secured together in any suitable manner so as thus to form the transverse connection 59 engaging the standards 6.

The extension 90 of each unit has an outflow tube 128 extending laterally and downwardly therefrom and discharging into the feed tube 88 of the next adjoining unit, each outflow tube being provided with a boss 129 to which a stud 130 is adjustably connected, this stud bearing upwardly against a node 93 so that, when the stud is adjusted the outflow tube 128 can be forced tightly against the feed tube 88 thereunder and said feed tube in turn clamped against the part therebeneath. It will be understood that by providing these studs 130 together with the studs 92 and by placing packing 131 between the meeting ends of the various tubes and chambers, leakage at the joints will be prevented.

The extension 90 of the last unit of the apparatus has an enlarged outflow tube 132 which opens into one of the standards 6 and which standard constitutes the outlet for the gangue and separating medium after the precipitation of the lightest value.

As hereinbefore stated water is preferably employed as a separating medium and in order that it may be supplied to the apparatus at the points necessary to insure thorough separation of the values a peculiar arrangement of ports and of means for supplying water to the ports, is provided. In the apparatus hereinbefore described, a main supply pipe 133 extends upwardly along one side of the apparatus and is provided with a discharge pipe 134 opening into the bottom portion of the feed tube 15, there being a valve 135 for controlling the flow of water through the pipe and said valve being provided with a suitable indicator 136 whereby the amount of water being discharged into the tube 15 can be accurately determined.

A distributing pipe 137 extends from the supply pipe 133 and has outflow pipes 138 and 139 arranged in pairs, one pipe 138 and one pipe 139 being provided for each unit. Each pipe 138 has a valve 140 for controlling the flow of water therethrough and an indicator 141 by means of which the amount of water passing through the pipe can be accurately determined. Each pipe 138 discharges into a port 142 formed in the wall of separating chamber 82 directly under the feed inlet from tube 85.

Each pipe 139 opens into branch pipes 143 and 144, the pipe 143 opening, through a port 145, into the separating chamber 82 directly under the lower end of outlet tube 86. This pipe 143 is designed to project a jet of separating fluid across the chamber 82 in a plane above the outlet of feed tube 85, as will be apparent by referring to Fig. 5. Branch pipe 144 extends downwardly and opens into the upper end portion of the collecting chamber 62. It is to be understood that each of the branch pipes 143 and 144 is to be provided with a valve 146 for controlling the passage of water through the pipe and this valve has a suitable indicator 147 whereby the amount of water discharged through the pipe may be accurately determined.

If desired the means for controlling the flow of water through the branch pipes may be constructed as shown in Figs. 15 and 16. In this form of device the pipe 139 is connected to its branches by a T 148 each branch of which is provided with a valve casing 149, both the T and the casings being arranged in a housing 150. Each valve casing is tapered and contains a tapered valve 151 having a stem 152 on which is arranged a spring 153. Both the valve and the inner surface of the casing have key seats for the reception of a key 154 so that, after rotating the valve so as to regulate the passage of water through the casing, the key 154 can be inserted into engagement with the valve and its casing and thus lock the valve against rotation. A cap 155 closes the end of casing 149 and constitutes an abutment for spring 153. Furthermore this cap prevents access being had to the key 154. Threaded studs 156 extend from the housing 150 and are detachably and adjustably engaged by a yoke 157 which extends across cap 155 and is engaged by a clamping screw 158 which bears against the cap. The yoke can be connected at its ends to the studs 156 by seals 159 so that tampering with the yoke for the purpose of removing it from the studs cannot be effected without detection. Obviously when the yoke is sealed in place, the key 154 cannot be reached and the valve 151 cannot be readjusted. This arrangement guards against the unauthorized adjustment of the valve and which would completely change the results obtained by the use of the separator.

When it is desired to use the apparatus herein described, the supply of water is turned on and the various valves are adjusted so that a desired quantity of water will be discharged into the feed tube 15, into the various separating chambers, from the settling and collecting chambers, and into the separating chamber by way of the ports 142 and 145. It is the practice when adjusting the valves to direct a greater volume of water into the collecting chamber of the first unit than into the collecting chamber of each succeeding unit so that, when values to be separated are directed into the first unit all but the heaviest particles will be elevated by the column of water rising within the settling chamber 80 of said unit while, when the values reach the second unit, all but the second heaviest values will be elevated by the column of water rising within the settling chamber, this operation continuing through the apparatus. In other words, if the material to be separated is made up of three values, the velocities of the separating medium are such that the heaviest value will be deposited in the collecting chamber of the first unit while the other values will be carried into the second unit and here again subjected to the action of an upwardly moving column of water of sufficient velocity to permit settling of the heaviest of the two values, the lightest value being directed into the third unit where it is precipitated into the collecting chamber.

The material to be separated is placed in the tube 15 and is directed therefrom by the feed wheel 13 into the outlet opening 11, the said feed wheel being operated by means of the mechanism hereinbefore described. At the same time water is directed into the opening 11 from the pipe 134 and flows with the material downwardly into the agitating chamber 42. At this point the values are thoroughly broken up by the rapidly rotating agitator coöperating with the fabric lining 57. Not only will the adhering particles of values be separated but all of the surfaces of the particles will be thoroughly moistened and air forced therefrom. After passing through the agitating chamber 43 the mixture of water and values gravitates into the tube 85 of the first unit and is directed into the first separating chamber 82 along lines extending practically horizontally across said chamber. As the values enter this separating chamber they are subjected to two forces, one of which is exerted by the lifting column rising within the settling chamber 80 and the separating chamber 82 while the other is exerted by the jet discharged through port 142. This last named jet enters the separating chamber directly under the point where the values are discharged therein and serves to scatter the values broadcast within the separating chamber so that all of them will be subjected to the action of the ascending column in the settling chamber. The heaviest values will gravitate into the settling chamber, the ascending current in said settling chamber being strong enough to lift all of the values except the heaviest ones. If these heaviest values, while gravitating through the settling chamber, should carry with them some of the lighter values, said lighter values will be held in suspension when arriving within any of the enlarged portions of the water column resulting from the provision of the channels or grooves 110. In other words, as the velocity of the rising column is greater in the contracted portions of the settling chamber than at other points, it will be seen that during the downward movement of the values, the velocity of the rising column will be such in the contracted portions as to throw upwardly all lighter values which may be descending and also retard the descent of the heaviest values. As a result of this arrangement of baffles each time the values pass through a contracted portion of the settling chamber, an upward impulse will be imparted to them, this impulse being sufficient to retard the heaviest values and to impel upwardly the lighter values. Consequently, before the heaviest values have reached the collecting chambers 62, all lighter values will have been separated therefrom and directed upwardly into the separating chamber 82.

The lighter values together with some particles of the heaviest values are thrown upwardly into the upper portion of the chamber 82 where they are subjected to further spreading and lifting action produced by a jet directed into the chamber 82 through port 145. As this jet is discharged across the chamber 82 along substantially horizontal lines, it comes against all portions of the values and insures thorough agitation thereof. The lifting action of the separating medium contained within the separating chamber 82 is sufficient to lift all values except those gravitating into the first collecting chamber, into the tube 86 and thence into the supplemental separating chamber 89. The values will here pass around or through the baffle, this being dependent upon the form of baffle used, and the velocity of the current through the contracted portions of the supplemental chamber 89 is such as to lift all values except particles of the heaviest value. Should any of these particles be carried into the supplemental chamber 89, they will be held in suspension when brought to position in the enlarged portions, such as those resulting from the use of grooves 96, and will ultimately gravitate from these points of suspension back into the separating chamber 82 from which they will ultimately move downwardly into the separating chamber and the collecting chamber.

The values elevated within the chamber 89 of the first unit are carried through the outflow tube 128 into the tube 88 of the next adjoining unit and in this second unit the separation of values is carried out in the same manner as hereinbefore described, the heaviest of the values discharged into said unit being retained therein while the remaining values are directed into the third unit. This operation is continued until the last separation is effected whereupon the separating medium and gangue will flow outwardly through the outflow standard 6, shown particularly in Fig. 4.
The values, after passing through the several settling chambers and into the collecting chambers will gravitate into receptacles 66 which receptacles can be withdrawn from under the units in the manner hereinbefore described.

It will be noted that the extensions 90 of all the units except the first, project upwardly considerable distances from the outflow pipes 128 and thus siphonic action within the units can be prevented simply by providing the spiders 91 between which air is admitted to the units. The extension 90 of the first unit, however, has its upper end so close to the outflow pipe 128, that it is necessary, in order to prevent overflow and at the same time prevent siphonic action, to close the upper end of said extension 90 and to extend a pipe 160 from said upper end into the trough-like top 7. At this point it might be stated that the top 7 can be of substantially the same construction as the base 1 but inverted so as to form a drain trough discharging into the outflow standard 6.

It has been found that where a quick separation of two values is to be effected a simple form of separator such as shown in Figs. 13 and 14, can be employed. This separator embodies the same principles as those found in the structure hereinbefore described but dispenses with the spreading jets which are admitted through the ports 142 and 145 shown in Fig. 5. The collecting chamber 161 has a reduced portion 162 extending upwardly therefrom and forming a settling chamber there being a gland 163 in the upper portion of this settling chamber for preventing leakage about a tubular separating chamber 164, slidably mounted in the gland. The lower portion of the separating chamber has a baffle 165 mounted therein and in the form of a tube which produces a restricted passage in the lower portion of the separating chamber and above the collecting chamber. A feed tube 166 opens through the wall of the separating chamber and is so curved as to direct values across the separating chamber without permitting them to move downwardly in said chamber under the impulse imparted thereto during their gravitation within the feed tube 166. A gland 167 is carried by the upper end portion of the separating chamber and surrounds a supplemental separating chamber 168 which is in the form of a tube having a baffle 169 therein. This baffle is tubular and forms a restricted passage. The upper end of the supplemental chamber 168 is open and an outflow pipe 170 is provided to convey the separating medium from the supplemental chamber.

Telescoping into the feed tube 166 is the tubular reduced end 171 of the agitating chamber 172. An agitator 173 is mounted for rotation in the chamber 172 and can be in the form of a shaft having radial fingers 174. The separating medium is supplied from pipe 139' the branches 143' and 144' of which open into the agitating chamber 172 and the collecting chamber 161 respectively. These branch pipes are provided with valves 149' similar to those shown in Figs. 15 and 16 for controlling the flow of water therethrough. When the mixture of values and water is fed into the separating chamber 164 it is met by an ascending column of water entering the collecting chamber 161 by way of pipe 144' and this column serves to elevate the lighter values while the heavier values gravitate through the baffle 165. At this point the velocity of the upwardly moving column of water is such as to throw upwardly any lighter values which may be commingled with the heavier values and carried downwardly therewith. The lighter values will be forced upwardly through the baffle 169 where the velocity is such that only the lighter values will be elevated and, should any heavier values become commingled with the lighter values at this point, they will gravitate into the separating chamber 164 and ultimately reach the settling chamber 162 and the collecting chamber 161.

A feature of primary importance in the structure shown in Figs. 13 and 14 is the fact that the said structure is telescopic, it being possible to adjust the separating chamber 164 upwardly or downwardly to bring the baffle 165 to any desired point relative to the collecting compartment 161 and it also being possible to adjust the supplemental separating chamber 168 to any desired position relative to the feed tube 166. In Fig. 13 the apparatus has been shown collapsed while in Fig. 14 it has been shown extended. By providing this adjustment the apparatus can be arranged for use in connection with different kinds of values. Furthermore in order that tampering with the apparatus by unauthorized persons may be quickly detected, sealed flexible connections between the movable parts of the apparatus may be provided as shown at 175 in Fig. 15. These connections are normally taut, but if the movable parts are shifted toward each other the connections will flex and, if the parts are shifted away from each other after adjustment the connections will break. Thus a quick examination of the apparatus will show whether or not the parts have been shifted after being adjusted to desired positions.

As hereinbefore stated, an important feature in a separator of this character is the provision of means whereby the values to be separated are first thoroughly moistened and mixed, and subsequently subjected to the lifting action of a rising column of water and to the spreading action of upper and lower jets directed into the mixture while being subjected to said lifting action. In the structure hereinbefore described the jets have been directed across the separating chamber at different elevations and from opposite sides but, if preferred, the jets can be directed into the values from points along the longitudinal center of the separating chamber and of the settling chamber. This arrangement of parts has been illustrated in the constructions disclosed in Figs. 17 to 24 inclusive and in Fig. 29.

In Figs. 17, 18 and 19, a large separator embodying the principles of the present invention has been disclosed, this separator being of a type particularly designed for separating slate from coal, and also for separating other like materials adapted to be directed into the separator by the car load. In this structure it will be seen that a trestle 176 is provided, the same supporting a track 177 on which the cars containing the coal, or other values to be separated, are adapted to travel, these cars being indicated at 178. A hopper 179 is supported below the track 177, one of these hoppers being provided for each separator used. In Fig. 18 three hoppers have been illustrated.

Each hopper has a trough 180 at the bottom thereof from which extends an outlet tube 181 having its outer end inclined downwardly, as at 182, so as to discharge into a small feed hopper 183 the top of which may be formed with an opening 184 normally closed by a cap or head 185. A feed screw 186 is mounted for rotation in the trough 180 and serves to direct the values from said trough into the tube 181 and to seal said tube. The shaft 187 of this screw projects through the tube 181 and is provided at its outer end with a gear 188 meshing with a gear 189 secured to a drive shaft 190 which may be extended along one side of the trestle, as shown particularly in Fig. 18. Another gear 191 is secured to this shaft 190 and meshes with a gear 192 secured to the upper end of a vertical shaft 193 extending downwardly through the center of the hopper 183. This hopper 183 is supported upon a top 194 which, in turn, may be supported by the units of the separator, as will be hereinafter set forth.

The base 195 of the separator is substantially similar to the top 194 only disposed oppositely thereto. This base supports the units of the separator. In the structure illustrated two of these units are provided. The first unit includes a feed tube 196 the upper portion of which constitutes an agitating chamber 197. Shaft 193 extends downwardly along the center of this agitating chamber and is journaled at its lower end in a spider 198. Agitating fingers 199 extend radially from the lower portion of shaft 193 and may be connected by rods 200 so that an agitator somewhat similar to that disclosed in Figs. 6 and 7 is produced. However, if desired, and as shown in Figs. 20, 21 and 22, the shaft of the agitator may be provided with outstanding fingers 201 disposed in vertical alinement although, if preferred, and as shown in Fig. 22, these fingers may be arranged in staggered relation, as at 202. Where fingers such as illustrated in Figs. 20, 21 and 22 are used, the agitating chamber may be lined with a coarse metal fabric such as shown at 203 and which is designed to cooperate with the fingers for thoroughly breaking up the values during their movement downwardly into the lower portion of the feed tube 196.

The feed tube discharges into one side of the separating chamber 204 of the unit and this separating chamber is located above a settling chamber 205. The bottom of the settling chamber opens into a collecting chamber 206. Extending from the top of the separating chamber 204 is a supplemental separating chamber 207 the diameter of which is less than that of the separating chamber, this supplemental chamber 207 opening into the upper end of the feed tube of the next adjoining unit. In order to prevent siphonic action a vent tube 208 extends upwardly from the supplemental chamber 207 and communicates with the interior of the top 194. As shown in the drawings the separating chamber as well as the settling chamber and the supplemental chamber are all provided with sight openings 209 closed by transparent plates whereby the contents of the chambers can be inspected whenever desired. The separating chambers of the two units provided are of different capacities, the separating chamber of the first unit being smaller than that of the second unit.

For the purpose of supplying the separating medium to the values at the proper points within the apparatus, a novel arrangement of nozzles is provided. The pipe for supplying the water or other separating medium to the units, has been indicated at 210 and has a branch pipe 211 extending therefrom and opening into the upper portion of the agitating chamber 197. This branch pipe may be provided with a suitable valve 212 having indicating means 213 whereby the amount of water flowing through the pipe 211 will be accurately designated. Branch pipes 214, 215 and 216 extend from the supply pipe 210 into the collecting chamber 206, these branch pipes discharging into separate concentric nozzles 217, 218 and 219 respectively. The nozzle 217 terminates within the settling chamber 205 at a point adjacent the center thereof while the intermediate nozzle 218 extends upwardly to a point near the top of the settling chamber or the bottom of the separating chamber. The innermost nozzle extends upwardly through the separating chamber 204 and terminates at the upper end of said chamber within the contracted lower end of the supplemental separating chamber 207. A spreading flange 220 extends around nozzle 218 close to the upper end of nozzle 217 and another spreading flange 221 extends around nozzle 219 close to the upper end of nozzle 218. The inner nozzle 219 has a spreading disk 222 supported close to and above its upper end. The longitudinal axes of the nozzles are coincident with the longitudinal axes of the chambers 204, 205 and 207 and it will be apparent, therefore, that when jets are directed from the open ends of the respective nozzles, they will be spread equally in all directions toward the walls of the compartments.

By arranging the nozzles as described and as illustrated in Figs. 17 and 23, it will be seen that the thoroughly moistened and broken up values will be supplied through the feed tube 196 into the separating chamber 204, this tube being so shaped as to direct the values across the separating chamber, thus preventing the values from moving downwardly against the action of the rising column of water in the unit under the momentum imparted to the values during their gravitation through the feed tube. Instead of having a port 142 in the wall of the settling chamber and directly under the discharge end of feed tube 196, as shown in Fig. 5, the same effect of lifting and spreading the values immediately upon their admission to the separating chamber, is produced by locating the discharge end of nozzle 218 and its spreading element 221 close to and under the level of the bottom of tube 196. The values, upon entering the separating chamber 204 are met both by the ascending column of water discharged from nozzle 217 and which is designed to lift all but the heaviest values, and by the spreading jet issuing from nozzle 218 and which supplements the ascending column from nozzle 217 for throwing the values upwardly in the separating chamber. The heaviest values will gravitate through the settling chamber into the collecting chamber 206 while all of the lighter values will be forced upwardly into the supplemental separating chamber 207 where the separating medium issuing from nozzle 219 will further spread the values and direct them upwardly through chamber 207 and into the feed tube 223 of the next adjoining unit. When the separating medium rises within the settling chamber 205 and enters the separating chamber 204 its lifting force is reduced in view of the increased capacity of the separating chamber and, consequently, the heaviest values will not be sustained but will gravitate in the manner hereinbefore described while all of the lighter values will be carried upwardly into the next unit in the manner set forth.

In order that the values admitted to the second unit may be separated, the separating chamber 224 is made of greater capacity than the chamber 204 and, when the values enter said chamber from the feed tube 223, they are met by an ascending column of separating fluid discharged from a nozzle 225 located in the settling chamber 226 of the second unit, this nozzle being provided with a spreading disk 227 above its outlet so that the fluid will be directed toward the wall of the settling chamber close to the lower end of the separating chamber. A reduced outlet tube 228 extends from the upper end of the separating chamber 224 and opens into a drain or waste pipe 229. A vent tube 230 extends from the tube 228 and communicates with the interior of the top plate 194 so that the creation of a siphonic action in the tubes is prevented. Obviously the column of water moving upwardly within the second unit will lift the lighter values while the heaviest values will be precipitated into the collecting chamber 231 arranged under the settling chamber 226. Nozzle 225 receives the separating fluid from supply pipe 210 through a branch pipe 232. It is to be understood that all of the branch pipes 214, 215, 216 and 232 are provided with valves 233 whereby the supply of water to the branch pipes may be controlled. Each of these valves has a suitable indicator 234 by means of which the amount of water flowing through the branch pipe can be accurately determined. Any preferred form of valves can be used and if desired the valves illustrated in Figs. 15 and 16 can be utilized.

Each of the collecting chambers 206 and 231 has parallel tubes 235 extending therefrom and connected at their upper ends by a housing 236 from which extends a chute 237. These tubes 235 form housings for the flights of an endless elevator consisting of a chain 238 and segmental buckets 239. These buckets are preferably formed with apertures 240 whereby water is free to drain therefrom. A sprocket 241 is mounted for rotation within the collecting chamber and is engaged by the chain 238 of the elevator while another sprocket 242 is mounted in the upper housing 236 and is engaged by said chain. This sprocket 242 is secured to a transverse shaft 243 carrying a sprocket 244 which, in turn, receives motion through a chain 245 from a sprocket 246 on shaft 190. Another sprocket 247 may be secured to shaft 190 and is adapted to transmit motion, through a chain 248 to a sprocket 249 secured to a shaft 250. This last named shaft is designed to transmit motion through gears 251 and 252 to a shaft 253 on which is arranged a sprocket 254. Said sprocket drives a chain 255 adapted to actuate the sprocket 244 of one of the elevators. Thus it will be seen that during the actuation of the drive shaft 190, the two elevators will be driven in opposite directions at the same speed, thus elevating the contents of the collecting chambers 206 and 231 and discharging them through the chutes 237 into cars or other receptacles 256 located at the sides of the trestle. Obviously by providing apparatus such as herein described values can be quickly separated in carload lots.

While separation of values can be effected solely by the use of concentrically disposed nozzles arranged in stepped relation, these nozzles can likewise be used in connection with a baffle, as illustrated in Fig. 29. In this construction the separating chamber has been indicated at 257 and the settling chamber at 258. The three branch pipes 259, 260 and 261 open into the respective nozzles 262, 263 and 264. Nozzle 264 is closed at its upper end by a flange 265 extending around nozzle 263 and apertures 266 are formed in the wall of this nozzle close to flange 265. A netting 267 extends around the apertured portion of the nozzle.

Nozzle 263 has a conical upper end or head 268 through which nozzle 262 extends, this head 268 being located in the upper end of the settling chamber 258. Apertures 269 are formed in nozzle 263 close to head 268, and a screen or metal fabric 270 extends around the apertured portion of the nozzle. That portion of nozzle 263 between flange 265 and screen 270 is formed with annular grooves 271 whereby the column of water ascending within the settling chamber from nozzle 264 will be of variable cross sectional area so that the values, when precipitated into the settling chamber will act in the same manner described in connection with the baffles 95. The jets discharged from nozzle 263 engage the values as they are discharged into the separating chamber 257 from the feed tube 272, thus spreading them and elevating them as hereinbefore described.

Nozzle 262 extends into the upper portion of the separating chamber 257 and has its upper end closed as shown at 273, there being apertures 274 in the upper portion of the wall of the nozzle through which jets of separating fluid are discharged for the purpose of spreading values within the upper portion of the separating chamber so as to facilitate separation thereof.

While certain of the parts of the different structures have been designated as tubes, it is to be understood that this term is used to cover any structure whether made of glass, metal, masonry, or other material and which structure is capable of performing the functions ascribed to the tubes described and claimed herein.

While only the structure shown in Figs. 12 and 13 has been shown adjustable, the other forms disclosed can also be made adjustable in the same manner without the exercise of invention.

Although the parts 220, 221, 222 and 265 have been designated as spreading means, it will also be understood that they also constitute baffles for producing restricted portions in the ascending column of water in the same manner as do the baffles 95, etc., hereinbefore described.

While only certain of the illustrated forms are provided with receptacles for receiving values from the collecting chambers, it is to be understood that the receptacles of this character can be easily applied to all of the illustrated structures without requiring the exercise of invention.

Attention is directed to the fact that in all of the settling and supplemental separating chambers the variation in the velocity of the separating medium is produced by restricting the passage and not by enlarging it. This has been found of importance in this art as the velocity of the current should at no time be less within either of these chambers than it is at the point of admission of the current to the chamber.

What is claimed is:—

1. Apparatus for separating values, including a separating chamber, means for directing an elevating column of separating fluid upwardly through said chamber, means for saturating the values while cut off from the separating chamber, and means for feeding the saturated values into the separating chamber in measured quantities without opening communication between said chamber and the point where saturation is effected.

2. Apparatus for separating values, including a separating chamber, means for directing an elevating column of separating fluid upwardly through said chamber, means for saturating the values while cut off from the separating chamber, means for feeding the saturated values into the separating chamber in measured quantities without opening communication between said chamber and the point where saturation is effected, and means for agitating the values prior to their admission to the separating chamber and after leaving said feeding means.

3. Apparatus for separating values, including a separating chamber, a feed tube opening thereinto, means for feeding measured quantities of saturated values into said tube, means below and spaced from the feeding means for agitating said saturated values within the said feed tube prior to their admission to the separating chamber, and means below and spaced from the agitating means for subjecting the values, while in the separating chamber, to the lifting action of an ascending column of separating fluid.

4. Apparatus for separating values including a collecting chamber, a settling chamber thereabove and opening thereinto, a separating chamber above and opening at its bottom into the settling chamber, a supplemental separating chamber above the said separating chamber, said supplemental chamber and the settling chamber being of less transverse areas than the separating chamber, means for directing values into said chamber, and means for directing a jet of fluid transversely across the separating chamber above the opening in the bottom of said chamber and directly below the inlet for the values, thereby to prevent downward movement of the valves in the separating chamber and settling chamber under the impulse imparted to the values during their gravitation within the supplying means.

5. Apparatus for separating values, including a separating chamber, an outflow tube thereabove, a collecting chamber below the separating chamber, means for directing values into the separating chamber along lines extending substantially horizontally thereacross, means for directing into the bottom of the collecting chamber an ascending column of separating fluid, a connection between the top of the collecting chamber and the bottom of the separating chamber for directing said ascending column into the bottom of said separating chamber, supplemental means for directing a jet of fluid through the side of the separating chamber above the open bottom thereof and below the value inlet for offsetting the downward impulse imparted to the values during their gravitation within the supplying means, and a connection between the top of the separating chamber and the outflow pipe, said connecting means and the separating chamber being proportioned to produce variable velocities of the ascending column.

6. Apparatus for separating values, including a separating chamber, means for directing a lifting column of separating fluid through said chamber from the bottom thereof, means for directing values through one side of said chamber along lines extending substantially horizontally thereacross, and means directly under and adjoining the point of admission of the values and above the open bottom of the separating chamber for directing a spreading jet of separating fluid against the values, said spreading jet being movable transversely of the path of movement of the lifting column of fluid.

7. Apparatus for separating values, including a separating chamber, means for directing a lifting column of separating fluid into said chamber from the bottom thereof, an outflow tube connected to the top portion of said chamber, means for directing values through one side of the chamber, and means for directing a jet of separating fluid into the chamber directly under and adjoining the point of admission of the values and means for directing a jet of separating fluid into the chamber directly under and adjoining the outlet into the outflow tube.

8. Apparatus for separating values, including a separating chamber, means for directing a lifting column of separating fluid into said chamber from the bottom thereof, an outflow tube connected to the top portion of said chamber, means for directing values into the chamber, and means for directing jets of separating fluid into opposite sides of the chamber above and below the point of admission of the values respectively, said lower jet directing means discharging into the chamber close to and directly under the point of admission of the values and said upper jet directing means being directly under the outlet into the outflow tube, said jets being directed into the chamber along substantially horizontal lines.

9. Apparatus for separating values, including a separating chamber, means for directing a lifting column of separating fluid into said chamber from the bottom thereof, an outflow tube connected to the top portion of said chamber, means for directing values into the chamber, and separate means for directing jets of separating fluid into the chamber directly under the point of admission of the values and between said point of admission and into the outflow tube respectively, said values and the jets being directed into the chamber along substantially horizontal lines.

10. Apparatus for separating values, including a separating chamber, a reduced portion communicating with the bottom thereof and constituting a settling chamber, an outflow tube communicating with the upper end of the separating chamber, means for directing values into the separating chamber, means within the settling chamber for directing an ascending column of fluid through the bottom of the separating chamber, and separate means within the bottom and upper portion of the separating chamber, respectively, for directing separating fluid into said separating chamber along substantially horizontal lines and across the path of the ascending column.

11. Apparatus for separating values, including a separating chamber, a settling chamber therebelow and opening thereinto, means for directing values diametrically into the separating chamber, an outflow tube communicating with the upper portion of the separating chamber and above the value inlet, means for directing an elevating column of separating fluid into the settling chamber and upwardly through the bottom of the separating chamber, means for directing fluid diametrically into the separating chamber at a point below the value inlet and across the path of the ascending column, and means for directing a jet of fluid diametrically into the separating chamber at a point between the value inlet and the outlet.

12. Apparatus for separating values, including a separating chamber, a settling chamber therebelow and opening thereinto, means for directing values into the separating chamber, an outflow tube communicating with the upper portion of the separating chamber and above the value inlet, means for directing an elevating column of separating fluid into the settling chamber and upwardly through the bottom of the separating chamber, means for directing a jet of fluid diametrically through one wall of the separating chamber and into the separating chamber at a point below and close to the value inlet, means for directing a jet of fluid diametrically into the separating chamber from one wall thereof at a point opposite the inlet of the other jet and between the value inlet and the outlet, both jets being adapted to flow along lines extending substantially horizontally across the separating chamber.

13. Apparatus for separating values, including a separating chamber, a settling chamber therebelow and opening thereinto, means for directing values into the separating chamber, an outflow tube communicating with the upper portion of the separating chamber and above the value inlet, means for directing an elevating column of separating fluid into the settling chamber, means for directing fluid into the separating chamber at a point below and close to the value inlet to offset the downward impulse of the values imparted during their gravitation within the value directing means, and means for directing a jet of fluid into the separating chamber below and close to the outlet of the separating chamber for agitating the contents of said chamber, said jet supplying means being movable into the separating chamber along lines intersecting the path of the elevating column.

14. Apparatus for separating values, including a separating chamber having a value inlet, a settling chamber thereunder and opening thereinto, a supplemental separating chamber connected to the upper portion of the separating chamber, means for directing a lifting column of separating fluid vertically through the settling chamber and the separating chamber, and closely assembled means within the settling chamber for producing a pulsating current throughout the length of said chamber.

15. In apparatus for separating values, a separating chamber, means for directing values thereinto, a settling chamber communicating with the bottom of the separating chamber, a collecting chamber thereunder, means for directing an elevating column of separating fluid vertically from the collecting chamber and through the settling chamber to the separating chamber, and closely associated superposed means included within and extending throughout the length of the settling chamber for causing pulsation of the ascending column.

16. In apparatus for separating values, a separating chamber, means for directing values thereinto, a settling chamber communicating with the bottom of the separating chamber, a collecting chamber thereunder, means for directing an elevating column of separating fluid from the collecting chamber and along substantially a straight course through the settling chamber to the separating chamber, and a series of superposed, closely assembled baffles supported within the settling chamber for producing variation in the velocity of the ascending column.

17. In apparatus for separating values, a separating chamber, means for directing values thereinto, a settling chamber communicating with the bottom of the separating chamber, a collecting chamber thereunder, means for directing an elevating column of separating fluid from the collecting chamber and through the settling chamber along a substantially straight course to the separating chamber, and a centrally disposed series of closely assembled superposed baffles within said settling chamber for producing rapid variation in the velocity of the ascending column.

18. Apparatus for separating values, including a separating chamber, a supplemental chamber communicating with the upper portion thereof and extending upwardly therefrom, means for directing an ascending column of separating fluid into the bottom of the separating chamber through said chamber to the supplemental chamber and along a substantially straight course through the supplemental chamber, and means suspended within said supplemental chamber for producing rapid variations in the velocity of the column throughout its ascent therein.

19. Apparatus for separating values, including a separating chamber, a supplemental chamber communicating with the upper portion thereof and extending upwardly therefrom, means for directing an ascending column of separating fluid into the bottom of the separating chamber, through said chamber to the supplemental chamber, and along a straight course through the supplemental chamber, and a plurality of superposed similar baffles within the supplemental chamber for varying the transverse area of the ascending column and thus producing rapid variations in the velocity of the ascending column throughout the length of said chamber.

20. Apparatus for separating values, including a separating chamber, a supplemental chamber communicating with the upper portion thereof and extending upwardly therefrom, means for directing an ascending column of separating fluid into the bottom of the separating chamber, through said chamber to the supplemental chamber, and along a straight course through the supplemental chamber, and a centrally disposed series of superposed baffles within the supplemental chamber for varying the cross sectional area of the ascending column, thereby producing rapid variations in the velocity of the ascending column within said chamber.

21. Apparatus for separating values including a separating chamber, said chamber having an outlet, means for directing values through the side of the chamber and transversely thereof, means for saturating the values prior to their admission into the separating chamber, means for directing an elevating column of separating fluid upwardly through the bottom of said chamber and toward the outlet, and means for subjecting the values at different elevations in the separating chamber to the action of spreading and agitating jets discharging in opposite directions respectively and across the path of the elevating column and between the open bottom of the separating chamber and the value inlet.

In testimony that I claim the foregoing as my own, I have hereto affixed my signature in the presence of two witnesses.

JOHN N. WINGETT.

Witnesses:
SELINA WILLSON,
I. E. SIMPSON.